(12) United States Patent
Mateu et al.

(10) Patent No.: US 8,749,218 B2
(45) Date of Patent: Jun. 10, 2014

(54) CONTROL CIRCUIT FOR A DC-DC CONVERTER USING A REFERENCE SIGNAL THAT IS HALF A VOLTAGE LEVEL OF A VOLTAGE OF A BATTERY TO BE CHARGED

(75) Inventors: Loreto Mateu, Nuremberg (DE); Markus Pollak, Erlangen (DE); Peter Spies, Herzogenaurach (DE)

(73) Assignee: Fraunhofer-Gesellschaft zur Foerderung der Angewandten Forschung E.V., Munich (DE)

( * ) Notice: Subject to any disclaimer, the term of this patent is extended or adjusted under 35 U.S.C. 154(b) by 0 days.

(21) Appl. No.: 13/101,756

(22) Filed: May 5, 2011

(65) Prior Publication Data
US 2011/0273158 A1      Nov. 10, 2011

Related U.S. Application Data

(63) Continuation of application No. PCT/EP2009/007359, filed on Oct. 13, 2009.

(30) Foreign Application Priority Data

Nov. 7, 2008  (EP) ..................................... 08019538

(51) Int. Cl.
*H02J 7/00* (2006.01)
*G05F 1/00* (2006.01)

(52) U.S. Cl.
USPC ............................ 323/284; 323/906; 320/166

(58) Field of Classification Search
USPC ......... 323/299, 205, 207, 222, 223, 282, 284, 323/906; 320/166
See application file for complete search history.

(56) References Cited

U.S. PATENT DOCUMENTS 5,801,519 A      9/1998 Midya et al.

OTHER PUBLICATIONS

R. Leyva et al.; MPPT of Photovoltaic Systems using Extremum—Seeking Control, Jan. 2006, IEEE, vol. 42, No. 1, 249-258.*
Lee et al.; A Simplified Analog Control Circuit of a MAximum Power Point Tracker, IEEE, May 2008.*
Nagayoshi et al.; Mismatch Power Loss Reduction on Thermoelectric Generator Systems USing Maximum Power POint Trackers, IEEE, Aug. 2006, pp. 210-213.*
Trishan Esram et al, Dynamic Maximum Power Point Tracking of Photovoltaic Arrays Using Ripple Correlation Control, Sep. 2006, IEEE, vol. 21, No. 5, 1282-1291.*
Chavez, et al.; "SPICE Model of Thermoelectric Elements Including Thermal Effects"; May 2000; 17th IEEE Instrumentation and Measurement Technology Conference, pp. 1019-1023, XP002515950.
Condemine, C. et al.; "Design Methodology for Energy Harvesting Microsystems"; Jun. 22, 2008; Joint 6th Int'l IEEE Northeast Workshop on circuits and Systems and TAISA Conference, pp. 181-184, Piscataway, NJ, USA, XP031312036.

(Continued)

*Primary Examiner* — Bao Q Vu
*Assistant Examiner* — Zekre Tsehaye
(74) *Attorney, Agent, or Firm* — Perkins Coie LLP; Michael A. Glenn

(57) ABSTRACT

A control circuit according to an embodiment of the present invention for a DC-DC converter which has an input, an output and a series connection of a differentiator, a comparator unit, and an integrator. The series connection is coupled in between the input and the output. The comparator unit has an inverting amplifier.

12 Claims, 12 Drawing Sheets

(56) References Cited

OTHER PUBLICATIONS

Esram, T. et al.; "Comparison of Photovoltaic Array Maximum Power Point Tracking Techniquest": Jun. 1, 2007; IEEE Transaction on Energy Conversion, vol. 22 No. 2, pp. 439-449, XP011184738.

Int'l Search Report dated Jan. 25, 2010 in related PCT application No. PCT/EP2009/007359, 13 pages.

Lim Yan Hong, et al.; "Simple Maximum Power Point Tracker for Photovoltaic Arrays"; May 25, 2000, IEEE Electroncis Letters, vol. 36, No. 11, pp. 997-999, Stevenage, GB, XP006015288.

Mateu, L. et al.; "Step-up Converters for Human Body Energy Harvesting Thermogenerators"; Nov. 28, 2007; PowerMEMS; pp. 213-216, XP002562592.

Sullivan, C.R. et al.; "A high-efficiency maximum power point tracker for photovoltaic arrays in a solar-powered race vehicle"; Jun. 20, 1993; Proceedings of the Annual Power Electronics Specialists Conference, pp. 574-580, XP010148931.

\* cited by examiner

| $V_{TEG-OC}$ | $V_{TEG-theory}$ | $V_{TEG-sim}$ | Error |
|---|---|---|---|
| 0.8 V | 32 mW | 30.59 mW | 4.4 % |
| 0.7 V | 24.5 mW | 23.38 mW | 4.6 % |
| 0.6 V | 18 mW | 17.1 mW | 5 % |

FIG 11A

| $V_{TEG-OC}$ | $V_{TEG-theory}$ | $V_{TEG-sim}$ | Error |
|---|---|---|---|
| 1.4 V | 49 mW | 48 mW | 2 % |
| 1.2 V | 36 mW | 35.9 mW | 0.3 % |
| 1 V | 25 mW | 24.45 mW | 2.2 % |

FIG 11B

CONTROL CIRCUIT FOR A DC-DC CONVERTER USING A REFERENCE SIGNAL THAT IS HALF A VOLTAGE LEVEL OF A VOLTAGE OF A BATTERY TO BE CHARGED

CROSS-REFERENCE TO RELATED APPLICATIONS

This application is a continuation of copending International Application No. PCT/EP2009/007359, filed Oct. 13, 2009, which is incorporated herein by reference in its entirety, and additionally claims priority from European Application No. 08019538.1, filed Nov. 7, 2008, which is incorporated herein by reference in its entirety.

BACKGROUND OF THE INVENTION

Embodiments according to the present invention relate to a control circuit for a DC-DC converter (DC=direct current), which, for instance, is employed in the framework of a maximum power point tracking circuit.

Maximum power point tracking (MPPT) is a control technique that extracts a maximum value or a value close to the maximum value of a power (maximum power) from an energy source or transducer, such as solar cells or thermogenerators. The MPPT control circuit is realized in the control loop of a DC-DC converter, which is placed between a solar cell or a thermogenerator and the battery that is, for instance, the load in order to create a virtual impedance equal to the impedance of the solar cell or the thermogenerator. Nowadays, most of the common techniques of MPPT employ digital signal processors (DSPs) or micro-controllers. Simpler solutions using only analog circuits already exist, but the power consumption and complexity of these solutions is by far not optimized and unsatisfactory for many applications.

The power consumption of the MPPT circuit is typically not a constraint for its use with solar cells in outdoor applications, but may be so for the case of thermogenerators and solar cells in applications where the amount of available power is of the order of some milliwatts only. In these cases, the minimization of the power consumption of the control loop of the DC-DC converter is of special interest.

MPPT control circuits are used in conjunction with switching DC-DC converters, mostly with boost or buck-boost DC-DC converters. There are some techniques which attempt to maximize the power extracted from the power supply and other techniques which attempt to maximize the power at the load. The maximization of the power extracted from the power supply needs typically the measurement of voltage and current and their processing employing a micro-controller, a digital signal processor or an analog multiplier in order to decide which change is needed for the control signal of the DC-DC converter.

The two most famous techniques forming state of the art are the hill climbing technique and the perturb and observe (P&O) technique. The hill climbing technique involves a perturbation of the duty ratio of the DC-DC converter, whereas the P&O technique involves a perturbation of the operating voltage of the energy supply. Both techniques, the hill climbing and P&O algorithms, are based on determining the next perturbation having the same sign as the previous perturbation, when the previous perturbation led to an increase in the power extracted from the energy supply. When there is a decrease in the power caused by the previous perturbation, the following perturbation will have the opposite sign.

Analog circuits are typically implemented in ripple correlation control techniques for reaching the maximum power point (MPP). However, in this case, both voltage and current at the output of the energy supply are to be sensed and a multiplier is needed in order to determine the value of the duty cycle of the switching DC-DC converter as a function of an integral over the changing of the power ($\dot{p}$) multiplied by the change of the frequency or the duty cycle of the DC-DC converter ($\dot{v}$) over time ($\int \dot{p}\dot{v}dt$).

However, when a battery or another voltage source is employed at the output of the DC-DC converter, the voltage level may be considered to be fixed and it can be assumed that, by only measuring the output current, an operation at the maximum power point (MPP) is achievable. However, this control technique does not reach exactly the maximum power point, since it assumes that input power is equal to output power.

A conventional DC-DC converter with a control circuit, which measures the output current of the DC-DC converter, employs a differentiator, a comparator, a JK flip-flop and an integrator as an MPPT control loop, has previously been designed and described in [4]. For this control system to operate correctly, it is to be assumed that the control signal is below the maximum power point (MPP) and the flip-flop output state is high. Thus, the duty cycle will increase and therefore also the output current. When the MPP is passed, the flip-flop changes its state and the duty cycle decreases its value. In this case, a second flip-flop is needed which can also respond properly to the reversed situation. However, the energy consumption in relation to its operational speed is unsatisfactory for many applications, e.g. mobile devices, and for energy transducers, such as solar cells or thermogenerators, with a limited amount of power. Moreover, solutions like these often comprise a disturbing level of drift in some of the previously mentioned components.

SUMMARY

According to an embodiment, a control circuit for a DC-DC converter may have an input; an output; and a series connection of a differentiator, a comparator unit and an integrator, the series connection being coupled in between the input and the output, wherein the comparator unit has an inverting amplifier, wherein the comparator unit is adapted to compare an input signal of the comparator unit to a reference signal, wherein the reference signal has half a voltage level of a voltage source coupled to an output of the DC-DC converter.

According to another embodiment, a A DC-DC converter system may have a control circuit for a DC-DC converter which again may have an input; an output; and a series connection of a differentiator, a comparator unit and an integrator, the series connection being coupled in between the input and the output, wherein the comparator unit has an inverting amplifier, wherein the comparator unit is adapted to compare an input signal of the comparator unit to a reference signal, wherein the reference signal has half a voltage level of a voltage source coupled to an output of the DC-DC converter; and a DC-DC converter, wherein the input of the control circuit is coupled to an output of the DC-DC converter and wherein the output of the control circuit is coupled to a control input of the DC-DC converter.

According to another embodiment, a mobile device may have a DC-DC converter system having a control circuit for a DC-DC converter, which may have an input; an output; and a series connection of a differentiator, a comparator unit and an integrator, the series connection being coupled in between the input and the output, wherein the comparator unit has an inverting amplifier, wherein the comparator unit is adapted to compare an input signal of the comparator unit to a reference signal, wherein the reference signal has half a voltage level of a voltage source coupled to an output of the DC-DC converter, and a DC-DC converter, wherein the input of the control circuit is coupled to an output of the DC-DC converter and wherein the output of the control circuit is coupled to a control input of the DC-DC converter; and a thermogenerator coupled, to an input of the DC-DC converter.

A control circuit for a DC-DC converter according to an embodiment of the present invention comprises an input, an output and a series connection of a differentiator, a comparator unit, and an integrator, wherein the series connection is coupled in between the input and the output, and wherein the comparator unit comprises an inverting amplifier.

Embodiments according to the present invention are based on the finding that a reduced power consumption and/or a reduced drift at the output of the comparator unit is achievable, by employing, as a comparator unit, an inverting amplifier. The inverting amplifier may then provide an output signal (e.g. a current) as an input to the integrator.

Employing a control circuit according to an embodiment of the present invention may comprise a very limited number of low-power analog components which allows for an overall lower power consumption while maintaining essential operational characteristics of conventional control circuits.

The presented control loop may be employed in conjunction with the step-up converter based on coupled inductors which is a self-oscillating DC-DC converter that works in the boundary region between continuous and discontinuous current modes. Therefore, by using such a self-oscillating DC-DC converter, a voltage proportional to the output current of the converter is often not modified due to a change in the operation mode of the DC-DC converter, when this voltage is employed as the input signal for the control circuit according to an embodiment of the present invention.

Moreover, employing embodiments according to the present invention may also offer a faster feedback signal generation. In other words, a response time of the control circuit according to an embodiment of the present invention may be reduced when compared to conventional approaches. This may also lead to a more precise operation of the DC-DC converter, due to the quicker response.

In embodiments according to the present invention, the inverting amplifier of the comparator unit may, for instance, be based on an operational amplifier or an operational amplifier circuit. The comparator unit and advantageously also the differentiator and the integrator may furthermore be provided with a reference signal having a voltage level equal to half the voltage level of a voltage source coupled to an output of the DC-DC converter. This may enable an operation of the control circuit on both sides of the maximum power point with only a positive voltage supply. The differentiator and the integrator may also comprise an operational amplifier circuit each, but may also be implemented differently.

The control circuit may furthermore comprise a processing unit adapted to filter the signal received at the input of the control circuit. Moreover, the processing unit may also be adapted to amplify the received signal. Naturally, the processing unit may also be implemented based on an operational amplifier or an operational amplifier circuit. The filtering and the amplifying may, therefore, be achieved in embodiments according to the present invention, by implementing a non-inverting amplifier with a feedback path comprising a parallel circuit of a resistor and a capacitor.

BRIEF DESCRIPTION OF THE DRAWINGS

Embodiments according to the present invention will be described with respect to the following drawings.

FIG. 11a-b show tables indicating the theoretical and simulated power extracted for different open circuit voltages of the thermogenerator and a comparison of the theoretical and measured power extracted for different open circuit voltages of a thermogenerator.

DETAILED DESCRIPTION OF THE INVENTION

Figure 1:
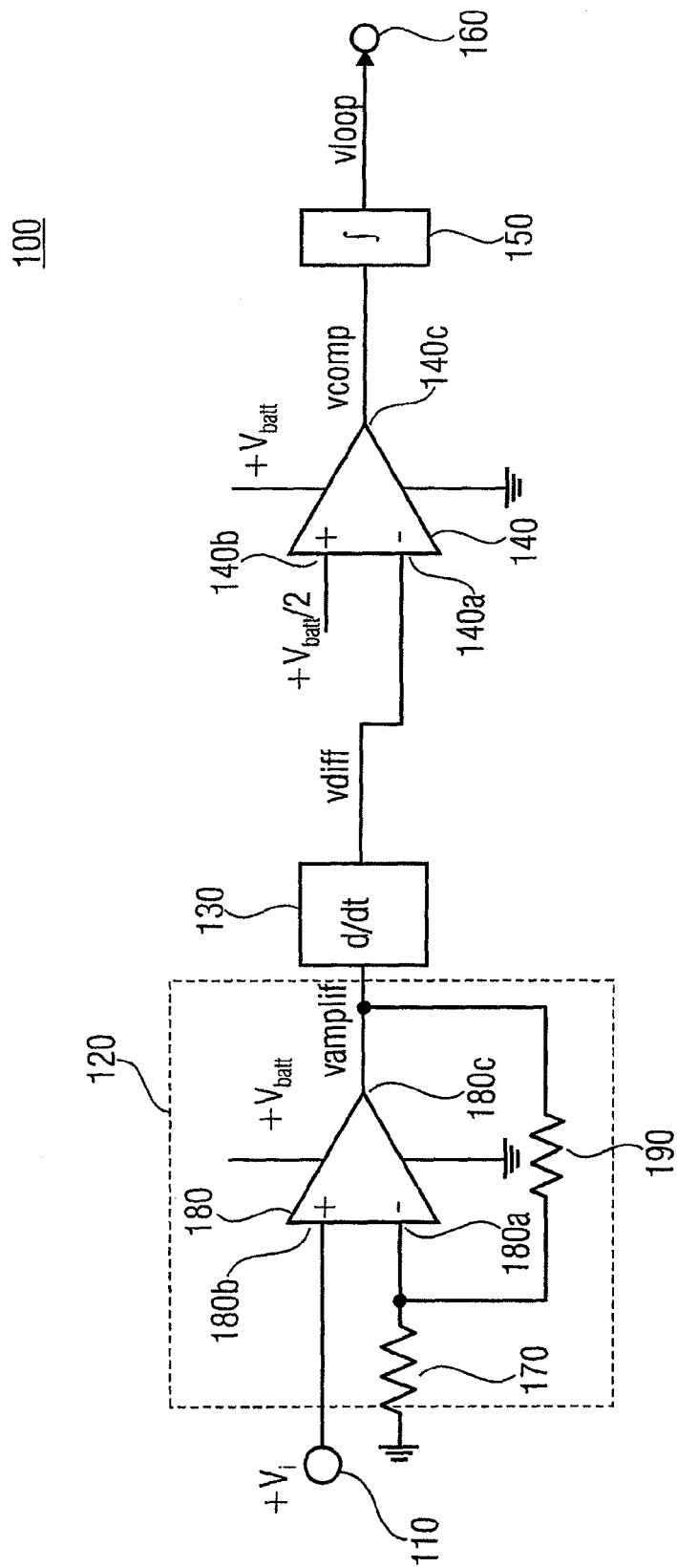
FIG. 1 shows a simplified block diagram of a control circuit for a step-up DC-DC converter based on coupled inductors according to an embodiment of the present invention.
Figure 2:
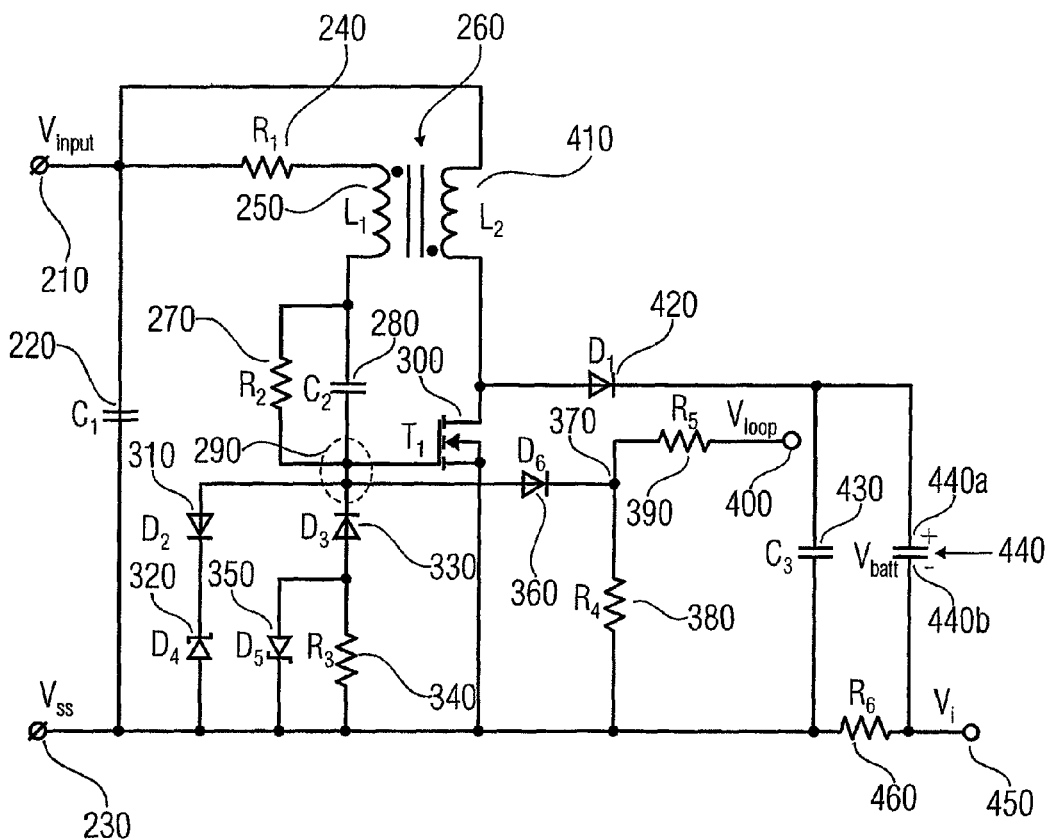
FIG. 2 shows a circuit diagram of a step-up DC-DC converter based on coupled inductors.
Figure 3:
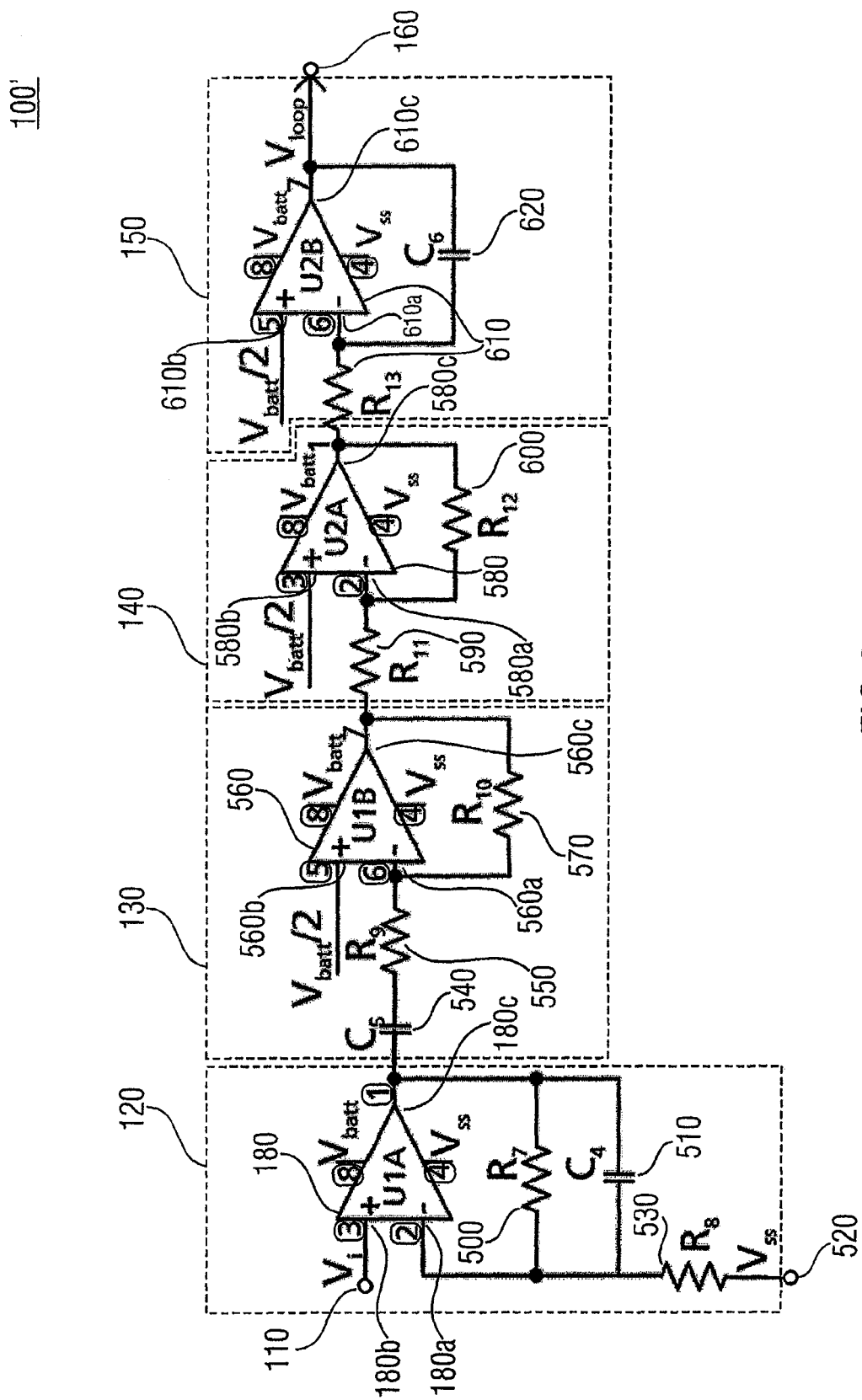
FIG. 3 shows a circuit diagram of a control circuit for a step-up DC-DC converter based on coupled inductors according to an embodiment of the present invention.
Figure 8:
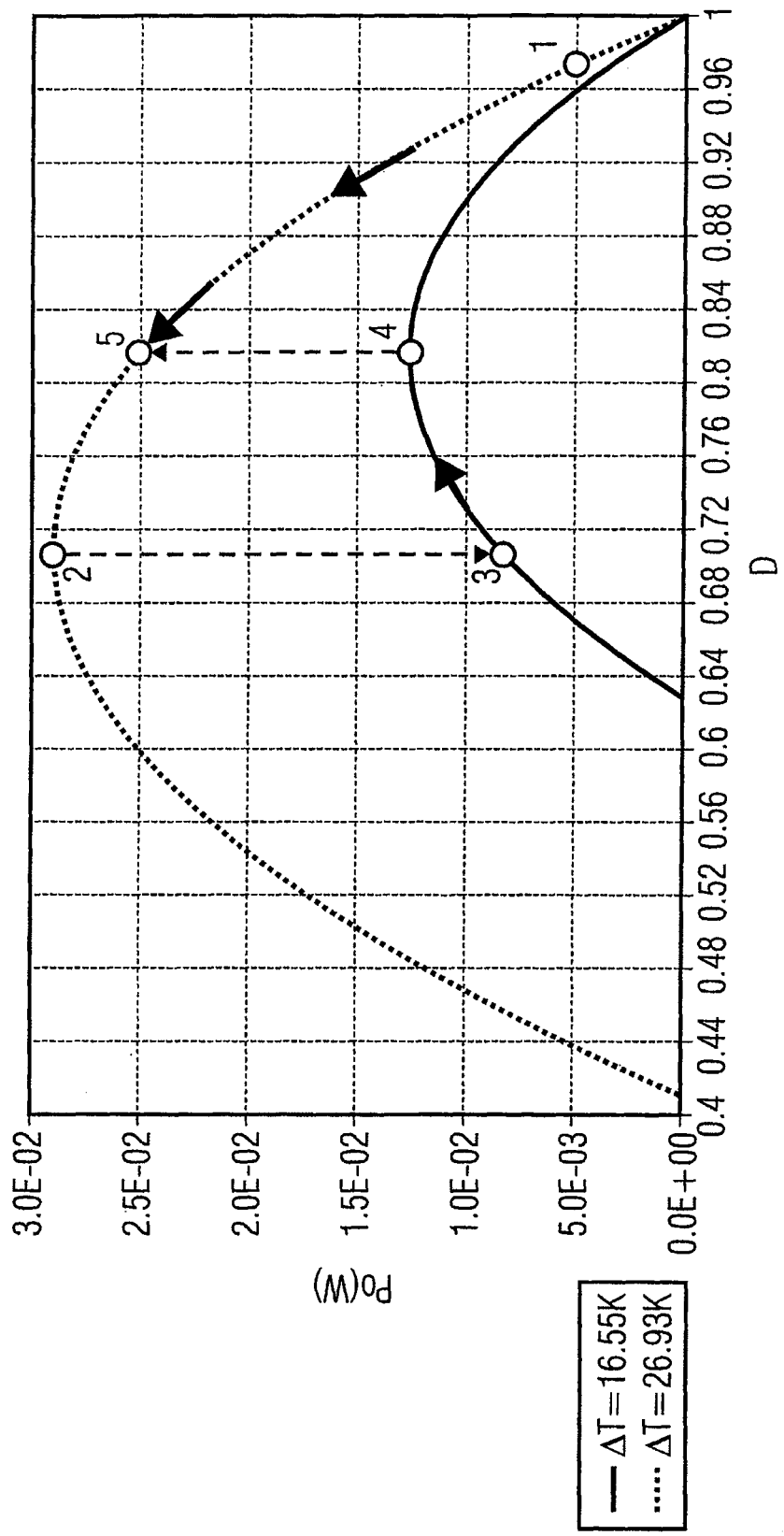
FIG. 8 shows a diagram of power-duty cycle output of a boost DC-DC converter and illustrates the operation of a maximum power point tracking where there is a change in the temperature gradient.
Figure 9:
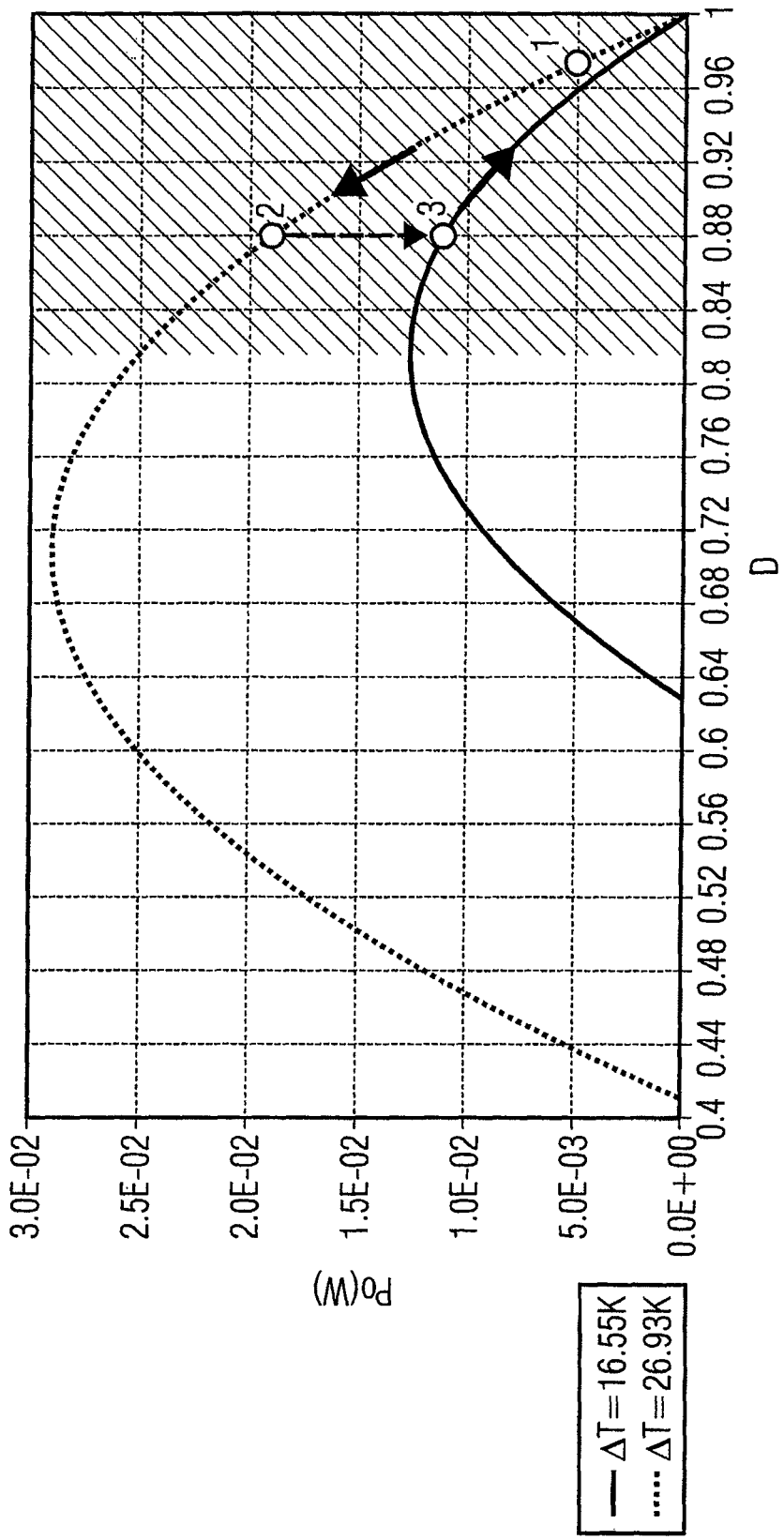
FIG. 9 shows a diagram of the output power-duty cycle output of the thermogenerator for two different gradients and illustrates a possible failure in the operation of the maximum power point tracking.
Figure 10:
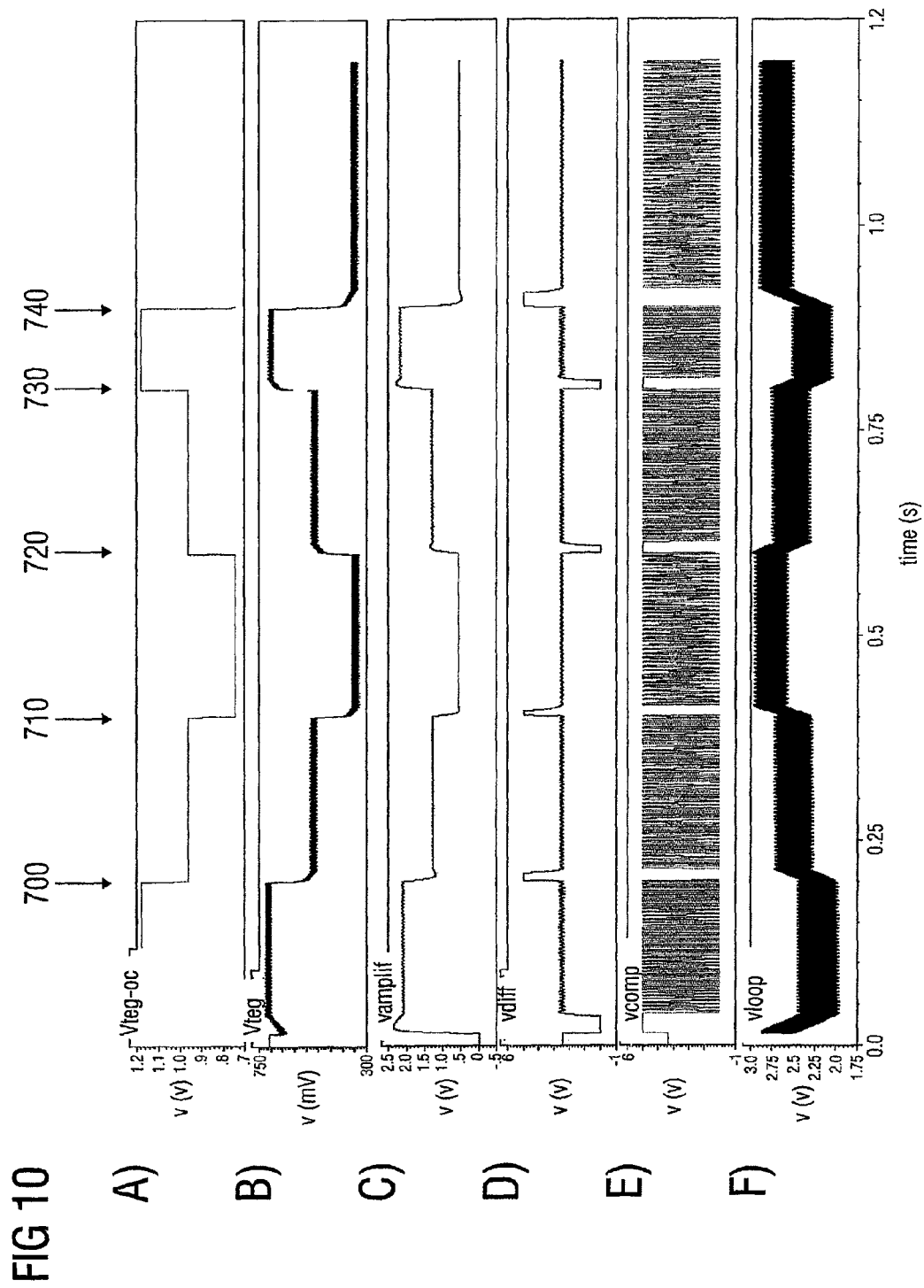
FIG. 10a-f shows diagrams of simulation results of a maximum power tracking circuit according to an embodiment of the present invention when the open-circuit voltage of the thermogenerator is modified.

With reference to FIGS. 1-12, a first embodiment of a present invention in the form of a control circuit for a step-up DC-DC converter based on coupled inductors will be described in more detail, before in FIG. 2 a step-up DC-DC converter based on coupled inductors will be described in more detail, which may be used in context with the control circuit shown in FIG. 1. With reference to FIG. 3, a further embodiment according to the present invention will be described in more detail. Afterwards, with reference to FIGS. 4-6, electrical and other properties of thermogenerators will be outlined in more detail, before in FIG. 7-9 operational principles of maximum power point algorithms will be outlined in more detail. FIGS. 10 and 11 show results of simulations and measured data, while FIGS. 12a and 12b show schematically a DC-DC converter and a mobile device according to an embodiment of the present invention.

DC-DC converters are frequently used in electronic engineering to convert a source of direct current (DC) from one voltage level to another. Depending on the voltage levels involved, DC-DC converters are often referred to as step-down or step-up converters. In the case where the output voltage of the respective converter is lower than the input voltage, the respective converter is typically referred to as a step-down converter or a buck converter. In contrast, step-up converters, which are also known as boost converters, are converters that output a voltage higher than the respective input voltages. Although in the following the main focus will be laid on a step-up DC-DC converter, embodiments according to the present invention are by far not limited to this type of converter, as will be outlined below.

It may be advantageous to employ embodiments according to the present invention with a converter that does not change from continuous to discontinuous mode because this change produces a variation in the output current of the converter, which in turn is the input signal of the control circuit. However, although a chance exists that the control loop might modify the duty cycle based on wrong information, an implementation of a control circuit according to an embodiment of the present invention along with a converter operating in the discontinuous mode or falling into the discontinuous mode may also be implemented.

However, to facilitate a better understanding of the technological and economical boundary conditions, an application for a control circuit for a DC-DC converter according to an embodiment of the present invention and a DC-DC converter will firstly be introduced.

Thermalgenerators or thermo electrical generators (TEG) may be used as energy harvesting power supplies instead of batteries in low power consumption applications, where a temperature gradient is present. As in solar cells, thermogenerators have a maximum power point (MPP) at which the transferred power from the thermogenerator to the connected load is maximized. The power generated by state of the art thermogenerator having, for instance, a size of 3×3 $cm^2$ and exposed to low temperature gradients in the range of a few Kelvin only (e.g. 3-10 K), is in the order of the units of milliwatts (mW).

Many algorithms and methods have been developed to employ maximum power point tracking in conjunction with solar cells for outdoor applications where the power generated is larger than in the case of thermogenerators. Therefore, the consumption of the maximum power point tracking circuit is not a constraint for its use with solar cells, but it is for the case of thermogenerators.

The object of maximum power point tracking (MPPT) circuits is to automatically find the maximum power point and, therefore, extract the maximum amount of power available in the energy supplier, i.e. the respective thermogenerator or the respective solar cells. Nowadays, the most common techniques of maximum power point tracking employ digital signal processors (DSPs) or micro-controllers, as for instance, outlined in [1].

However, simpler solutions employing analog circuits already exist, but the power consumption and complexity of these solutions is still not fully optimized (cf. [2]).

In the following a simple analog circuit will be presented in the form of a control circuit for a DC-DC converter according to an embodiment of the present invention which may be operated as a maximum power point tracking circuit. As will be shown below, such a control circuit may be implemented on the basis of only four low-power consumption operational amplifiers in conjunction with a step-up converter based on coupled inductors. The design presented here, therefore, employs only four low-power operational amplifiers instead of analog multipliers, micro-controllers or flip-flops which would have a higher power consumption.

In the following, the focus will be laid on a step-up converter, since state of the art thermogenerators generate approximately an open circuit voltage of 50 mV/K which makes the use of step-up converters advisable, if not, unavoidable. However, control circuits according to the present invention are by far not limited to this kind of step-up converters.

The DC-DC converter on which the focus will be laid here, is, however, a DC-DC converter that does not change from continuous to discontinuous current mode. The step-up converter achieves this by using coupled inductors in the form of a transformer, which typically works on the boundary between both modes. As a consequence, a control circuit according to an embodiment of the present invention may be advantageously used together with such a DC-DC converter.

Before describing a possible step-up DC-DC converter in more detail in the context of FIG. 2, first of all a simplified block diagram of a control circuit according to an embodiment of the present invention will be described with reference to FIG. 1.

FIG. 1 shows a control circuit 100 for a DC-DC converter (not shown in FIG. 1). The control circuit 100 comprises an input 110 which is coupled to a series connection comprising a processing unit 120, a differentiator 130, a comparator unit 140, and an integrator 150. An output of the integrator 150 is coupled to an output 160 of the control circuit 100.

It should be noted that the processing unit 120, which may also act as a filtering unit, is an optional component, which is not required to be implemented in the framework of all the control circuits 100 according to embodiments of the present invention. The processing unit 120 comprises a first resistor 170 which is couple in between a terminal for a reference potential (e.g. ground, GND) or a negative power supply voltage and an inverting input 180a of an operational amplifier 180. It should be noted that the term negative supply voltage does not necessarily imply a voltage level being lower than the reference potential (e.g. GND, 0 V). It merely refers to the fact, that compared to the positive power supply voltage this voltage is smaller. It is in many cases positive.

A non-inverting input 180b of the operational amplifier 180 is coupled to the input 110 at which an input signal (e.g. a voltage with a voltage level Vi) is provided to the control circuit 100. For the sake of simplicity only, the processing unit 120 is shown in FIG. 1 as a non-inverting amplifier. However, as will be outlined below, in the context of FIG. 3 in more detail, the processing unit 120, which is may also be referred to as a non-inverting amplifier unit 120, may comprise a low pass filter to eliminate the ripple of the DC-DC converter output.

An output 180c of the operational amplifier 180 is coupled to the inverting input 180a via a second resistor 190. In other words, the output 180c of the operational amplifier 180 is fed back via the second resistor 190 to the inverting input 180a. The operational amplifier 180 along with the two resistors 170, 190 therefore forms a non-inverting amplifier, the gain factor of which is determined by the resistances of the resistors 170, 190. The output 180c also forms an output of the processing filtering unit 120.

The differentiator 130 is coupled with an input to the output 180c of the operational amplifier 180, and with an output, to an input of the comparator unit 140. For the sake of simplicity only, the comparator unit 140 is shown in FIG. 1 as a comparator having an inverting input 140a coupled to the output of the differentiator 130, and a non-inverting input 140b, which is coupled to a reference signal. However, as will be outlined below, in the context of FIG. 3 in more detail, the comparator unit 140 comprises an inverting amplifier with high gain. Compared to a conventional comparator, employing an inverting amplifier offers the advantage that a drift of the signal is smaller. Depending on the implementation of the inverting amplifier, this may be caused by a feedback inherent to such an implementation.

The integrator 150 is coupled in between an output 140c of the comparator unit 140 and the output 160 of the control circuit 100.

For the sake of completeness, it should be noted that the operational amplifier 180 of the optional processing unit 120 and the comparator unit 140 each comprise a terminal for a positive supply voltage (+Vbatt or Vcc) and a terminal for a reference potential (e.g. ground (GND)) or a negative supply voltage (Vss).

In the case that the optional processing unit 120 is omitted, the input 110 may be directly coupled to the differentiator 130.

In this context, it should also be noted that two components being coupled to each other may be either directly connected via a sufficiently well-conducting signal line or may be indirectly connected via a third component. To illustrate this, the output 180c of the operational amplifier 180 is coupled to the inverting input 180a of the operational amplifier 180 by the second resistor 190, although the output 180c is directly connected to one terminal of the second resistor 190, while the inverting input 180a is coupled to a second terminal of the second resistor 190.

In a concrete application, the input 110 may be coupled to a DC-DC converter to receive an input signal (e.g. having a voltage level Vi) indicative of a power provided by the converter, a current provided by the converter, or a voltage provided by the converter to its load. This input signal Vi is amplified and optionally filtered by the processing unit 120, as shown in FIG. 1, so that at the output 180c of the operational amplifier, an amplified signal the vamplif will be provided to the differentiator 130.

The differentiator 130 generates a derivative with respect to time of the signal provided to its input. In other words, the differentiator 130 provides, at its output, a signal vdiff, which is a differentiated version of the amplified input signal with respect to time. Thus, a voltage above or below the reference voltage at the input (cf. non-inverting input 560b in FIG. 3) indicates that the DC-DC converter output current is decreasing or increasing, respectively. This will be described in more detail in FIG. 10.

The signal provided by the differentiator is then delivered to the comparator unit 140, which is adapted to compare the signal to a reference signal provided to the input 140b of the comparator unit 140. In the embodiment shown in FIG. 1, the reference signal comprises a voltage signal Vbatt/2 of half the voltage level of the positive supply voltage Vbatt. The comparator unit 140 provides, at its output 140c, a comparator signal vcomp, which is then provided to the integrator 150.

The comparator unit 140 may give, for instance, an output voltage equal to its negative supply voltage (Vss or GND) when the DC-DC converter output current is decreasing and equal to its positive supply voltage when the DC-DC converter output current is increasing. When there are no changes in the DC-DC converter output current, the output 140c oscillates between both supply voltage of the comparator unit 140.

The integrator 150 is adapted to integrate the signal over time and to provide an integrated signal vloop at its output to the output 160 of the control circuit 100. The signal vloop represents the control or feedback signal for the DC-DC converter, closing the control loop thereof.

Figure 7:
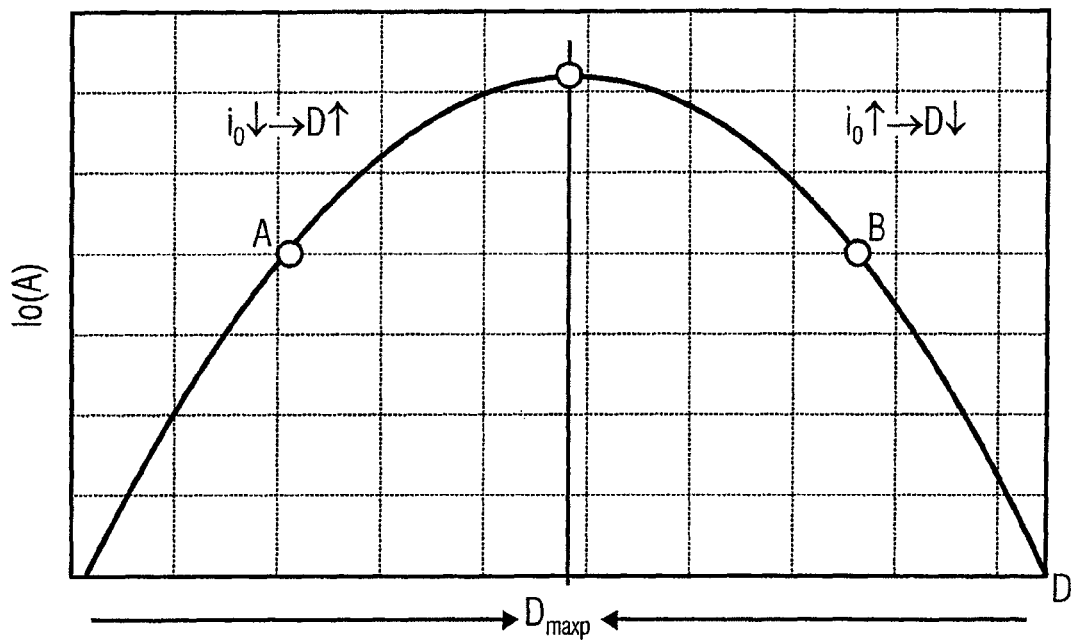
FIG. 7 shows a diagram of an output current-duty cycle output for a step-up converter.

The output of the integrator 150 (cf. output 610c of the integrator in FIG. 3) increases its voltage when the DC-DC converter output current decreases to return to the maximum power point (MPP), whereas it decreases its voltage when the DC-DC converter output current increases, as it is illustrated in FIG. 7. When there is no change in the DC-DC converter output current, the output of the integrator maintains its voltage value since in this case the output of the comparator unit 140 provides an oscillating voltage between the negative and positive supply voltages with a mean value equal to zero.

To summarize, the control circuit 100 as shown in FIG. 1 optionally amplifies the input signal Vi, differentiates the (amplified) signal with respect to time, compares the differentiated signal to a reference signal and integrates the comparison signal, based on the comparison of the differentiated signal and the reference signal, with respect to time before providing the integrated signal to the output 160.

As will become apparent, the output 160 of the control circuit 100 is connected to a control signal input (cf. control signal input 400 in FIG. 2) without a pulse width modulation (PWM) circuit, since for the step-up converter based on coupled inductors as shown in FIG. 2, this is not required due to the fact that it is based on a self-oscillating control circuit.

FIG. 2 shows a coupled inductor boost DC-DC converter 200, which is adapted to step-up a low voltage provided, for instance, by a thermogenerator (not shown in FIG. 2). The converter 200 comprises an input 210 to which the previously mentioned input voltage Vinput of the thermogenerator, the photo cell or the energy harvesting device may be supplied to. The input 210 is coupled to a first capacitor 220 ($C_1$=470 µF), which is coupled in between the input 210 and a further input 230 for the reference potential or the negative supply voltage Vss. Here, the capacitance value of the capacitor 220 is given in brackets behind the mentioned device. Also in the case of other elements, their dimensioning is given in brackets. However, it should be noted that this dimensioning represents only a possibility of values. Embodiments according to the present invention may be implemented with different dimensions.

The input 210 is furthermore coupled via first resistor 240 ($R_1$=5 kΩ) to a first terminal of a first inductance 250 ($L_1$=549 mH). The first conductance 250 is part of a transformer 260. A second terminal of the first inductance 250 is coupled to a parallel connection of a second resistor 270 ($R_2$, potentiometer of 1 MΩ) and of a second capacitor 280 ($C_2$=1 nF). The second resistor 270 may be implemented as a potentiometer with a maximum value of 1 MΩ. However, the second resistor 270 may also be implemented as "fixed" resistor without the possibility of changing its value. The parallel connection of the second resistor 270 and the second capacitor 280 is coupled to an internal node 290, which is in turn coupled to a control terminal of a transistor 300, which is also denoted in FIG. 2 as $T_1$.

In FIG. 2, the transistor 300 is shown as an n-channel enhancement MOSFET (Metal Oxide Semiconductor Field Effect Transistor), so that the control terminal coupled to the internal node 290 is a gate terminal. Naturally, also other field effect transistors (e.g. p-channel transistors and/or depletion transistors) and bipolar transistors may be implemented depending on the application and other circumstances in mind.

The internal node 290 is furthermore coupled to an anode of a first diode 310, which is also referred to in FIG. 2 as $D_2$. A cathode of the first diode 310 is coupled to a cathode of a first Zener diode 320, which is also referred to in FIG. 2 as $D_4$. An anode of the first Zener diode 310 is coupled to the further input 230.

In parallel to this branch, the internal node 290 is also coupled to a cathode of a second diode 330, which is also referred to in FIG. 2 as $D_3$. A parallel connection of a third resistor 340 ($R_3$=25 kΩ) and a second Zener diode 350, which is also referred to in FIG. 2 as $D_5$, is coupled in between an anode of the second diode 330 and the further terminal 230 for the negative supply voltage or the reference potential (Vss). The second Zener diode 350 is coupled to the further input 230 with a cathode so that an anode of the third diode 330 is coupled to an anode of the second Zener diode 350.

The internal node 290 is furthermore coupled to a cathode of a third diode 360 which is also referred to in FIG. 2 as $D_6$. A cathode of the third diode 360 is coupled to a center tap 370 of a voltage divider comprising a series connection of a fourth resistor 380 ($R_4$=75 kΩ) and a fifth resistor 390 ($R_5$=15 kΩ). The voltage divider is coupled in between the further terminal 230 for the negative supply voltage or the reference potential (Vss) and a control signal input 400, at which a control signal with a voltage level Vloop as provided by the control circuit 100 shown in FIG. 1 may be provided to the converter 200. To be more precise, the fifth resistor 390 is coupled to the control signal input 400, while the fourth resistor 380 is coupled to the further input 230.

The converter 200 further comprises a second inductor 410 ($L_2$=506 μH) which is also part of the transformer 260. The second inductance 410 is coupled with the first input to the input 210. With the second terminal, the second inductance 410 is coupled to a drain terminal of the transistor 300 and to an anode of a fourth diode 420 which is also referred to in FIG. 2 as $D_1$. A source terminal of the transistor 300 is coupled to the further input 230 for the negative supply voltage of the reference potential.

A cathode of the fourth diode 420 is coupled to a first terminal of a third capacitor 430 ($C_3$=470 μF), a second terminal of which is coupled to the further input 230 for the reference potential of the negative supply voltage. Moreover, the cathode of the fourth diode 420 is also coupled to a terminal for a positive voltage 440a of a voltage source 440. A terminal 440b for a negative voltage of the voltage source 440 is coupled to an output 450 of the converter 200. The output 450 is coupled to the further terminal 230 for the negative power supply voltage of the reference potential via the sixth resistor 460 ($R_6$=5Ω), which is also referred to as a shunt resistor.

In the embodiment shown in FIG. 2, the voltage source 440 is a rechargeable battery or accumulator providing between the two terminals 440a, 440b, a voltage Vbatt. In a concrete implementation, the voltage source 440, which may also be referred to a battery 440, may for instance be an NiMH rechargeable battery (NiMH=Nickel Metal Hydride), a lithium ion rechargeable battery (Li-battery) or another rechargeable battery. The battery 440 in the circuit shown in FIG. 2 represents the load of the converter. Therefore, in other applications, the terminals 440a, 440b of the battery 440 may be replaced or coupled to outputs of the DC-DC converter 200 itself.

The concrete application in mind for the DC-DC converter 200 shown in FIG. 2 is to provide a sufficiently large voltage for charging or recharging the battery 440 by means of a significantly smaller voltage Vinput provided to the input 210 by, for instance, a thermogenerator. This is achieved by a self-oscillating switching mode DC-DC converter circuit, which is mainly formed by the second inductance 410, the transistor 300, the diode 420 and the third capacitor 430. The transformer 260 along with the first inductance 250, as well as the second capacitor 280 along with the further resistors, diodes and Zener diodes (apart from the first capacitor 220 and the sixth resistor 460) form an internal control circuit for controlling the transistor 300.

The branch coupled between the internal node 290 and the further input 230 comprising the first diode 310 and the first Zener diode 320 represents an over-voltage protection for the internal node 290 and, hence, for the gate terminal of the transistor 300. The branch coupled to the internal node 290 comprising the second diode 330, the second Zener diode 350 and the third resistor 340 represents, on the one hand, an under voltage protection for the internal node 290, and on the other hand, provides a recharging path for the internal node 290 in case of potentials present at the internal node 290 being significantly smaller than the negative supply voltage of the reference potential present at the further input 230.

Finally, the third branch coupled to the internal node 290 comprising the third diode 360, as well as the voltage divider with a centered tap 370, the fourth resistor 380 and the fifth resistor 390 provide the opportunity to influence the potential of the internal node 290 and, therefore, the duty ratio of the DC-DC converter 200 by applying a voltage to the input 400.

The first capacitor 220, coupled in between the input 210 and the further input 230, is a short circuit for high frequency contributions entering the converter at the input 210.

Coupling the input 110 of the control circuit 100 to the output 450 of the converter 200 and coupling the output 160 of the control circuit 100 to the input 400 of the converter 200, provides a control loop formed by the control circuit 110 to the converter 200 that allows an analog maximum power point tracking. The control loop 100 employs the voltage Vi, which is proportional to a current Ibatt flowing into the battery 440 as input.

Behind the amplifier in the form of the processing unit 120, the control circuit 100 comprises the differentiator 130, the comparator unit 140 and the integrator 150. These three components, which may be implemented based on three operational amplifiers, as will be laid out in more detail below, are referenced to the reference signal having the voltage Vbatt/2 in order to employ only a single positive power supply and to be able to respond to increments and decrements of the current Ibatt flowing into the battery 440.

The differentiator 130 is employed to determine when the current flowing into the battery 440 is increasing or decreasing. In the next stage, the comparator unit 140 gives an output voltage between +Vbatt and Vss (e.g. 0 V, GND or another negative power supply voltage) depending on whether the current Ibatt is increasing or decreasing, respectively. The integrator 150 provides a voltage which is incremented or decremented proportionally over time, depending on the voltage obtained by the comparator unit 140. The output of the integrator 150 is sometimes also referred to as the control signal, regulating signal or feedback signal for the boost DC-DC converter 200. It controls the gate voltage of the transistor 300 of the converter 200 based on the two coupled inductors 250, 410. The analog control circuit 100 is, therefore, working as an analog maximum power point tracking circuit for the step-up DC-DC converter 200 as shown in FIG. 2.

The step-up DC_DC converter 200 based on coupled inductors 200 operates in the boundary region between the continuous current mode (CCM) and the discontinuous current mode (DCM) due to its topology. When the current flowing through the second inductor 410 ($L_2$) is increasing, a negative voltage is induced across the first inductor 250 ($L_1$) providing a positive gate voltage for the transistor 300 ($T_1$). As the current through the second inductor 410 ($L_2$) continues flowing, the second capacitor 280 ($C_2$) is discharged until the gate voltage of the transistor 300 ($T_1$) is lower than the gate-source threshold voltage of the transistor 300 ($T_1$). At this moment, the transistor 300 ($T_1$) stops conducting and the current through the second inductor 410 ($L_2$) is maximum. Once the transistor 300 is cut-off, the current through the second inductor 410 ($L_2$) decreases and a positive voltage is induced across the first inductor 250 ($L_1$) charging again the second capacitor ($C_2$) until the current flowing through the second inductor 410 ($L_2$) is zero and the gate voltage of the transistor 300 ($T_1$) is above its gate-source threshold voltage. This switching cycle caused by the control of the gate terminal of the transistor 300 ($T_1$) with the secondary winding of the transformer 260, which primary winding is the explanation of the fact that the DC-DC converter 200 works in the boundary between DCM and CCM.

In the following, circuits, objects and elements having a similar or equal functionality will be referred to by similar or the same reference signs. Moreover, unless stated otherwise, circuits, objects and elements being referred to by the same reference signs may be implemented equally, e.g. having the same dimensioning, unless stated otherwise. However, this is not a requirement.

FIG. 3 shows a further control circuit 100', which is similar in its basic structure to the control circuit 100 shown in FIG. 1. The control circuit 100' also comprises a series connection of an optional processing unit 120, a differentiator 130, a comparator unit 140 and an integrator 150, coupled in between an input 110 and an output 160.

The optional processing unit 120 comprises an operational amplifier 180. The input 110, by which the input signal with the input voltage Vi indicative of the power, current or voltage output by the DC-DC converter is provided to the control circuit 100', is coupled to a non-inverting input 180b of the operational amplifier 180. An output 180c of the operational amplifier 180 is coupled via a parallel circuit of a first transistor 500 ($R_7$=500 kΩ) and a first capacitance 510 ($C_4$=330 pF) to the inverting input 180a of the operational amplifier 180. Therefore, the operational amplifier 180 is operated in a feedback mode.

The inverting input 180a of the first operational amplifier 180 is furthermore coupled to a terminal 520 for the reference potential or the negative supply voltage Vss via a second resistor 530 ($R_8$=25 kΩ). Therefore, the operational amplifier 180 forms—along with the resistors 500, 530 and the capacitor 510—a non-inverting amplifier, which comprises a RC filter element (resistor 500, capacitor 510) in its feedback loop.

As already mentioned in the context of FIG. 2, the quantities given in brackets refer to the corresponding electrical dimensioning of the respective components. In other words, the first resistor 500 comprises a resistance value $R_7$. Naturally, these values are not required values, but represent only possible values of an implementation.

The output 180c of the operational amplifier 180 is coupled to an input of the differentiator 130. The differentiator 130 comprises a second capacitor 540 ($C_5$=47 nF), which is coupled in series with a third resistor 550 ($R_9$=50 kΩ) to an inverting input 560a of a second operational amplifier 560. The previously mentioned reference signal with the voltage level Vbatt/2 is provided to a non-inverting input 560b of the operational amplifier 560. An output 560c of the operational amplifier 560 is fed back via a fourth resistor 570 ($R_{10}$=500 kΩ) to the inverting input 560a. As a consequence, at the output 560c of the operational amplifier 560, which is also the output of the differentiator 130, a signal proportional to a time derivative of the signal provided to the second capacitance 540 or the input of the differentiator 130 is generated.

The output of the differentiator 130 is coupled to the comparator unit 140. As outlined before, the comparator unit 140 comprises an inverting amplifier, which is formed by a third operational amplifier 580, a fifth resistor 590 ($R_{11}$=5 kΩ) and a sixth resistor 600 ($R_{12}$=500 kΩ). To be more precise, the output 560c of the operational amplifier 560 of the differentiator is coupled to a terminal of the fifth resistor 590, which in turn is coupled to an inverting input 580a of the operational amplifier 580. A non-inverting input 580b is coupled to the reference signal as mentioned before, having the voltage level Vbatt/2. An output 580c of the third operational amplifier 580 is coupled via the sixth resistor 600 to the inverting input 580 of the operational amplifier 580. As a consequence, the comparator unit 140 comprises only the inverting amplifier formed by the operational amplifier 580 and the two resistors 590, 600. The gain factor of the operational amplifier is determined by the ratio of the two resistance values $R_{11}$ and $R_{12}$ of the two resistors 590, 600, which is typically in the range of ($10^2$=) 100 and above. In other words, the comparator unit 140 comprises a high-gain inverting amplifier. The ratio of the two resistance values $R_{11}$ and $R_{12}$ should be chosen to obtain at the output 580c of the operational amplifier 580 a signal that swings between the positive and negative voltage supplies when the input voltage 110 is constant.

The output 580c of the third operational amplifier 580 also represents the output of the comparator unit 140, which is coupled to an input of the integrator 150. The integrator 150 comprises a fourth operational amplifier 610 to which the output 580 of the third operational amplifier 580 is coupled via a seventh resistor 610 ($R_{13}$=35 kΩ). A non-inverting input 610b of the operational amplifier 610 is once again coupled to the previously mentioned reference signal having the voltage level Vbatt/2.

An output 610c of the fourth operational amplifier 610 is fed back to the inverting input 610a via the third capacitor 620 ($C_6$=2.2 µF). Moreover, the output 610, at which the output signal (Vloop) is also obtainable, is coupled to the output 160 of a control circuit 100'.

The functionality of the control circuit 100' shown in FIG. 3 does not significantly differ from the functionality of the control circuit 100 shown in FIG. 1. The differentiator 130 is implemented in the control circuit 100' shown in FIG. 3 based on an operational amplifier circuit. The integrator 150 is also based on a corresponding operational amplifier circuit. However, as outlined before, the comparator unit 140 comprises an inverting amplifier which provides the control circuit 100' compared to a conventional circuit employing analog multipliers, flip-flops or comparators with a faster signal processing speed. This may be caused due to the fact that the operational amplifier 580 shown in FIG. 3 is operated in a closed feedback mode so that the operational amplifier 580 is—more or less—maintained in an equilibrium state. Changes of the input signal provided to the inverting input 580a may, therefore, lead to smaller deviations from the equilibrium state, compared to the classical comparator or a flip-flop. This feedback may also lead to a smaller drift of the output of the comparator unit 140 compared to a conventional comparator.

In these components, a significant change of the state is to be internally handled by the respective component, while the operational amplifier 580 is only needed to compensate deviations from the previously mentioned equilibrium state. Hence, the additional speed by the inverting amplifier may, for instance, be caused by a lack of the requirement to change the charge state of a comparably large (internal) capacitor or the requirement to generate sufficiently high currents in the case of a flip-flop.

Therefore, employing an inverting amplifier in the framework of the comparator unit 140 offers the possibility of increasing the signal speed and may therefore enable a more precise control of the converter 200, as for instance, shown in FIG. 2.

The optional processing unit 120, however, comprises a further feature. Apart from the fact that the amplifier circuit of the processing unit 120 is a non-inverting amplifier, by implementing the first capacitor 510 in the feedback path between the output 180c and the inverting input 180a of the operational amplifier 180, along with the first resistor 500, a low pass filtering may be implemented for the input signal with a characteristic cut-off frequency $f_p$. In other words, the processing unit 120 is adapted to provide at its output, a filtered and optionally amplified version of the input signal. The gain factor indicative of the amplification depends on the resistance values $R_7$ and $R_8$ of the two resistors 500, 530 and should be chosen high enough to be able to operate properly the rest of the operational amplifiers that compose the control loop of FIG. 3.

For the sake of completeness, it should also be noted that the four operational amplifiers 180, 560, 580, and 610 are each provided with a positive supply voltage Vbatt of the battery 440 of FIG. 2. Moreover, each of the four operational amplifiers 180, 560, 580, and 610 is coupled to the reference potential of the negative supply voltage Vss.

Naturally, circuits as previously described may be implemented as integrated circuits, as circuits based on discrete electrical elements, e.g. discrete resistors, capacitors, and inductors, or a combination of both. To illustrate the last option, in FIG. 3 the first operational amplifier 180 is denoted by U1A, while the second operational amplifier 560 is denoted by U1B. Moreover, the terminals (inputs or outputs) of the respective operational amplifiers are denoted by encircled numbers 1 to 8 indicating a pin number of a corresponding integrated circuit, which may be used in the framework of implementing the circuit. Hence, the two operational amplifiers 180, 560 may be implemented by a single integrated circuit (IC)—e.g. MAX4474 of MAXIM.

The third and fourth operational amplifiers 580, 610 are also denoted in FIG. 3 by U2A and U2B, respectively, with their terminals being labeled by encircled numbers 1 to 8 accordingly. Also these to operational amplifiers may be implemented using the same IC. As a consequence, the circuit shown in FIG. 3 may be implemented based on two integrated circuits comprising the four operational amplifiers and the respective number of resistors and capacitors.

By combining the control circuit 100' of FIG. 3 or the control circuit 100 of FIG. 1 with the converter 200 as shown in FIG. 2, an analog maximum power point circuit applicable to thermogenerators may be obtainable. The value of the output signal 160 of FIG. 3 that determines the duty cycle of the maximum power point tracking control loop is calculated as a function dIbatt/dD in continuous current mode or in the boundary between continuous and discontinuous current modes, wherein D is the duty cycle of the DC-DC converter 200. This is achieved by the fact that the input voltage Vi of the control circuit 100 is proportional to the current Ibatt flowing into the battery 440 and by the differentiator 130 providing a derivative with respect to time which is proportional dIbatt/dt. In other words, via the derivative with respect to time, the derivative with respect to the duty cycle D is determined.

As the output voltage of the DC-DC converter 200 is connected to the battery 440, it is assumed that output power and current are proportionally due to the fact that the voltage is fixed by the battery 440. When the current increases, the duty cycle of the DC-DC converter should be decreased in order to achieve the maximum power point. When the current decreases, the duty ratio should be increased in order to return to the maximum power point. The correct operation of the control loop of FIG. 3 may depend on the fact that the value of the output voltage 160 of control loop 100' assures that the duty cycle of the DC-DC converter 200 of FIG. 2 starts operation with a value above the duty cycle value obtained for the maximum power point.

The maximum power point tracking and control loop is composed of a non-inverting amplifier in the framework of the processing unit 120, the differentiator 130, the inverting amplifier comprising the operational amplifier 580, resistor 590 and resistor 600 with high gain that acts as a comparator and the integrator 150. The non-inverting amplifier of the processing unit 120 amplifies the voltage proportional to the current and filters its signal. Filtering this voltage, which is proportional to the output current of the DC-DC converter, avoids that the control loop responds to the current ripple present due to the operational principle of being a switching DC-DC converter.

The next operational amplifiers 560, 580, and 600 of the differentiator 130, the inverting amplifier of the comparator unit 140 and the integrator 150 are coupled with their positive inputs to the reference signal Vbatt/2 (=Vcc/2) in order to center their outputs to the value of the reference signal allowing positive and negative voltage swings of the input signal at the input 110.

The differentiator 130 calculates a signal essentially proportional to dIbatt/dt. It is a second order high-pass filter with a pole at a frequency $f_p$ and a zero at a frequency of f=0 Hz. In this manner, the output of the differentiator 130 comprises the derivative only of the signals that have a frequency lower than the boundary frequency $f_p$. The gain for higher frequencies is fixed.

With respect to the comparator unit 140, the inverting amplifier has a high gain to work between the two voltage supplies (Vbatt and Vss=0 V (GND)), which power the operational amplifier 580.

The integrator 150 is a first order low-pass filter. Its output is the control signal Vloop which modifies the duty cycle of the DC-DC converter 200 by being provided to the input 400 thereof. Thus, higher frequencies would have lower effect in the amplitude response than lower frequencies. The output of the integrator 150 is connected through the diode 360 to the switching transistor 300 of the DC-DC converter 200. Therefore, the output of the integrator 150 modifies the duty cycle of the converter 200. The cutoff frequency of the integrator 150 is very low in order to not modify the value of output signal 160 too fast due to changes in the input signal 110 and oscillate far away from the duty cycle for which is obtained the maximum power point or stabilize the output signal at the output 160 with a value that does not provides the maximum power point.

After the summary of the basic features of the solution employing a control circuit according to an embodiment of the present invention, a more detailed description of the operational principles of the control circuit 100 or the control circuit 100', which will both be denoted by the common reference sign 100, along with the DC-DC converter 200 will be given next.

When the output current of the DC-DC converter 200 starts to increase, the non-inverting amplifier of the processing unit 120 provides an output voltage proportional to the current. Then, the differentiator 130 provides an output voltage below Vbatt/2. Then, since the input voltage is lower than the value of the reference signal (Vbatt/2), the high gain inverting operational amplifier of the comparator unit 140 gives an output voltage value, which is equal to the battery supply voltage Vbatt. Therefore, the output of the integrator 150 starts to decrease its output voltage, which has an initial value corresponding to the value of the reference signal. As long as the current is continuous increasing its value, the output of the integrator 150 will continue to decrease its value in order to decrease the duty cycle.

Once the current reaches its maximum value, it remains constant and the differentiator output has a value of the value of the reference signal Vbatt/2. Therefore, the high gain inverting amplifiers of the comparator unit 140 swings between Vbatt and Vss (=0 V). The output of the integrator 150 remains constant at the value that provides the optimum duty cycle for extracting the maximum power from the power source.

When the output current of the DC-DC converter 200 is decreasing, the differentiator 130 provides an output voltage greater than the reference signal (Vbatt/2). Therefore, the high gain inverting amplifier of the comparator unit 140 provides the voltage of 0 V. As a consequence, the output of the integrator 150 increases its value until the optimum duty cycle is reached.

The adjustment of the passive components of the circuit is a sensitive point. When there is a change in the open circuit voltage of the energy harvesting power supply, e.g. a thermogenerator, the maximum power point tracking loop responds to it. However, the values of the passive components of the circuit may lead to the situation that the change in the control signal leads to a change of the integrator output being greater than needed. If the open circuit voltage decreases, the current also decreases and the output of the integrator increases its value. Nevertheless, this decrease can cause that the output of the integrator surpasses its optimum value.

This behavior may continue until the voltage at the differentiator reaches the value of the reference signal (Vbatt/2), since the slope of the output current caused by the increment of the duty cycle is typically smaller than the slope caused by the decrease of the open circuit voltage of the energy harvesting power supply. Due to the differentiator 130 acquiring a value of Vbatt/2 and due to the ripple of its voltage, the maximum power point tracking continues oscillating and the current starts to increase. An increase in the current causes a reduction of the value of the output voltage of the integrator 150.

Once the output current of the converter 200 reaches its maximum value, the output voltage of the integrator 150 remains constant.

The control circuit 100 and designed in combination with a DC-DC converter 200 based on coupled inductors provides the possibility of implementing an analog maximum power point tracking circuit with a minimum number of components. Therefore, its power consumption is also minimized compared with previous designs. For instance, the control circuit 100 does not require a pulse width modulation (PWM) circuit since the output voltage of the maximum power point tracking circuit (control circuit 100) is the control signal for the switching element (transistor 300) of the DC-DC converter 200. A control circuit 100 according to an embodiment of the present invention may, therefore, be especially interesting for power optimized systems.

As outlined in the introductory portion of the description, such a possible technical application area is the use of a thermogenerator as an energy harvesting power supply. Therefore, in the following, a short analysis of the operational principles and the performance of thermogenerators will be given to facilitate a better under understanding of the usefulness of embodiments according to the present invention.

First, an electrical model for a thermogenerator will be outlined. The design of a maximum power point tracking circuit for a thermo electrical generator or thermogenerator (TEG) needs the knowledge of its equivalent electrical circuit as well as the levels of its output voltage and power. The electrical part of the thermo electrical generator may be described by a voltage source providing a voltage level Vteg-oc (oc=open circuit) and an internal resistor with a resistance value Rm as outlined in [3]. Hence, the voltage Vteg-oc is equal to the output voltage of the thermogenerator Vteg for vanishing currents I (Vteg-oc=Vteg (I=0)). The value of Vteg-oc is proportional to the temperature gradient ΔT between a hot junction and a cold junction of the thermogenerator and is also proportional to the Seebeck coefficient $\alpha_m$ of a thermo electrical module according to $$V_{teg\text{-}oc} = \alpha_m \Delta T \tag{1}$$

Figure 4:
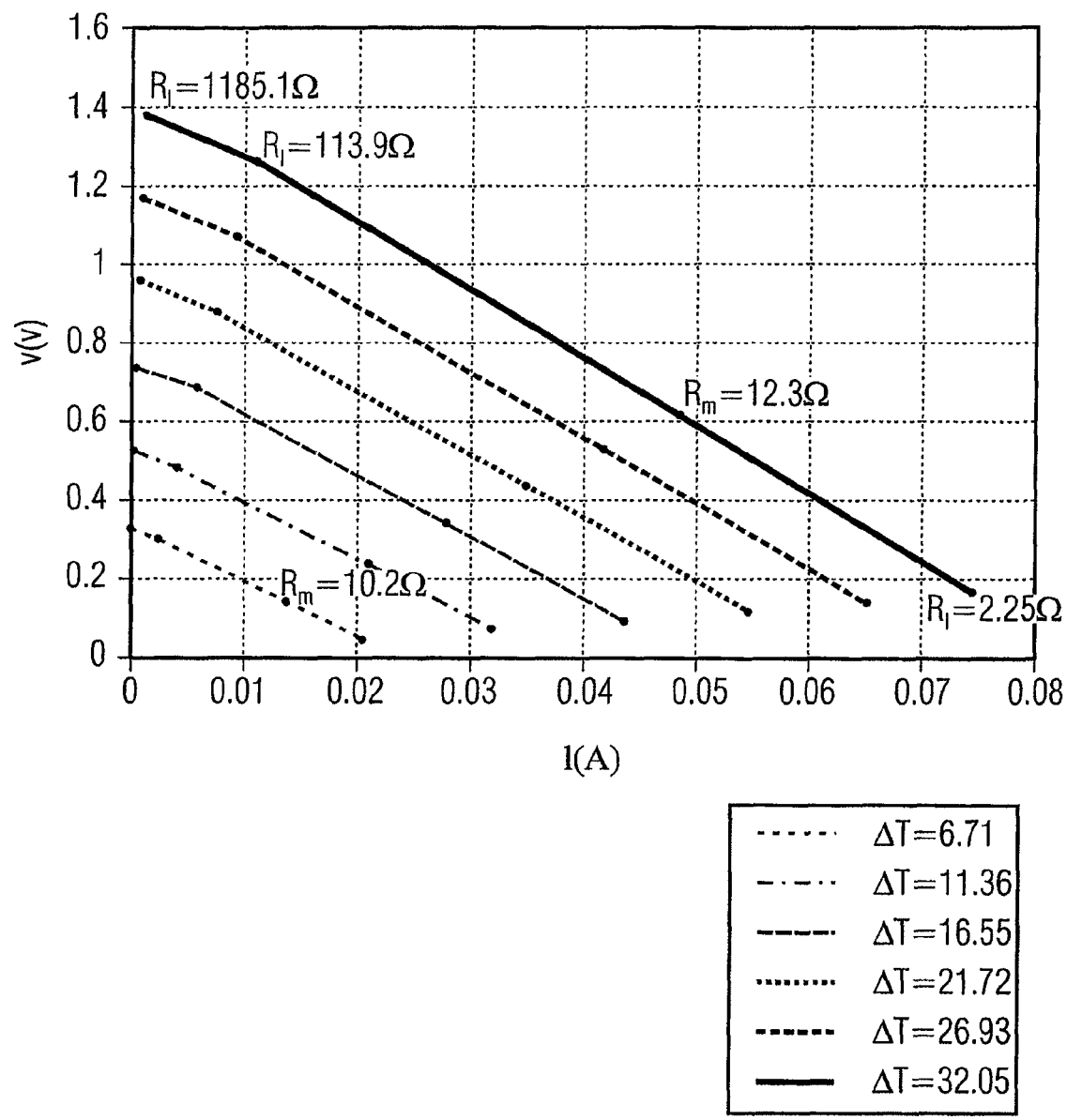
FIG. 4 shows a comparison of output voltage-output current characteristics of a state of the art thermogenerator for different temperature gradients.
Figure 5:
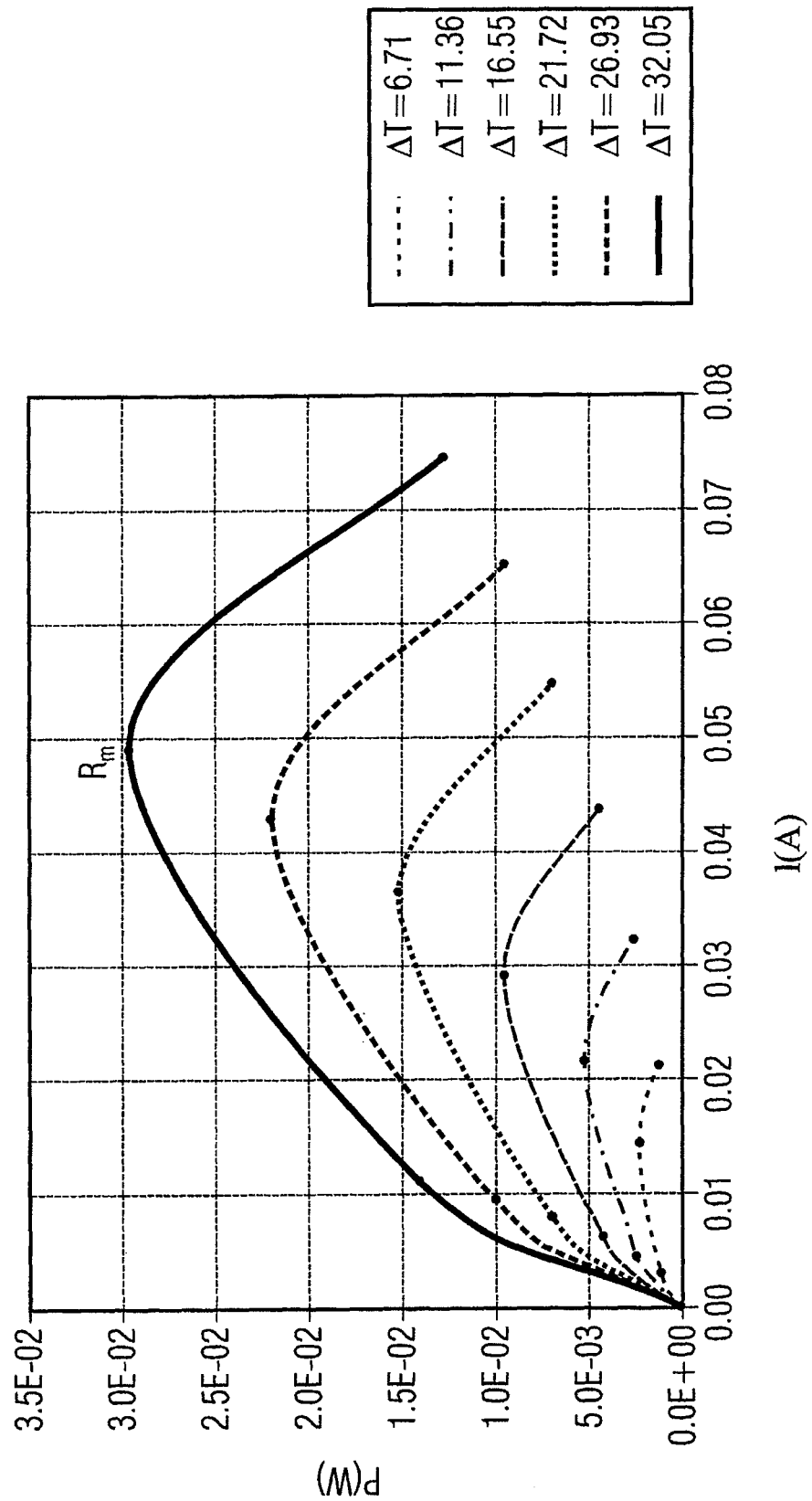
FIG. 5 shows a diagram of output power-output current characteristics of a state of the art thermogenerator for different temperature gradients.
Figure 6:
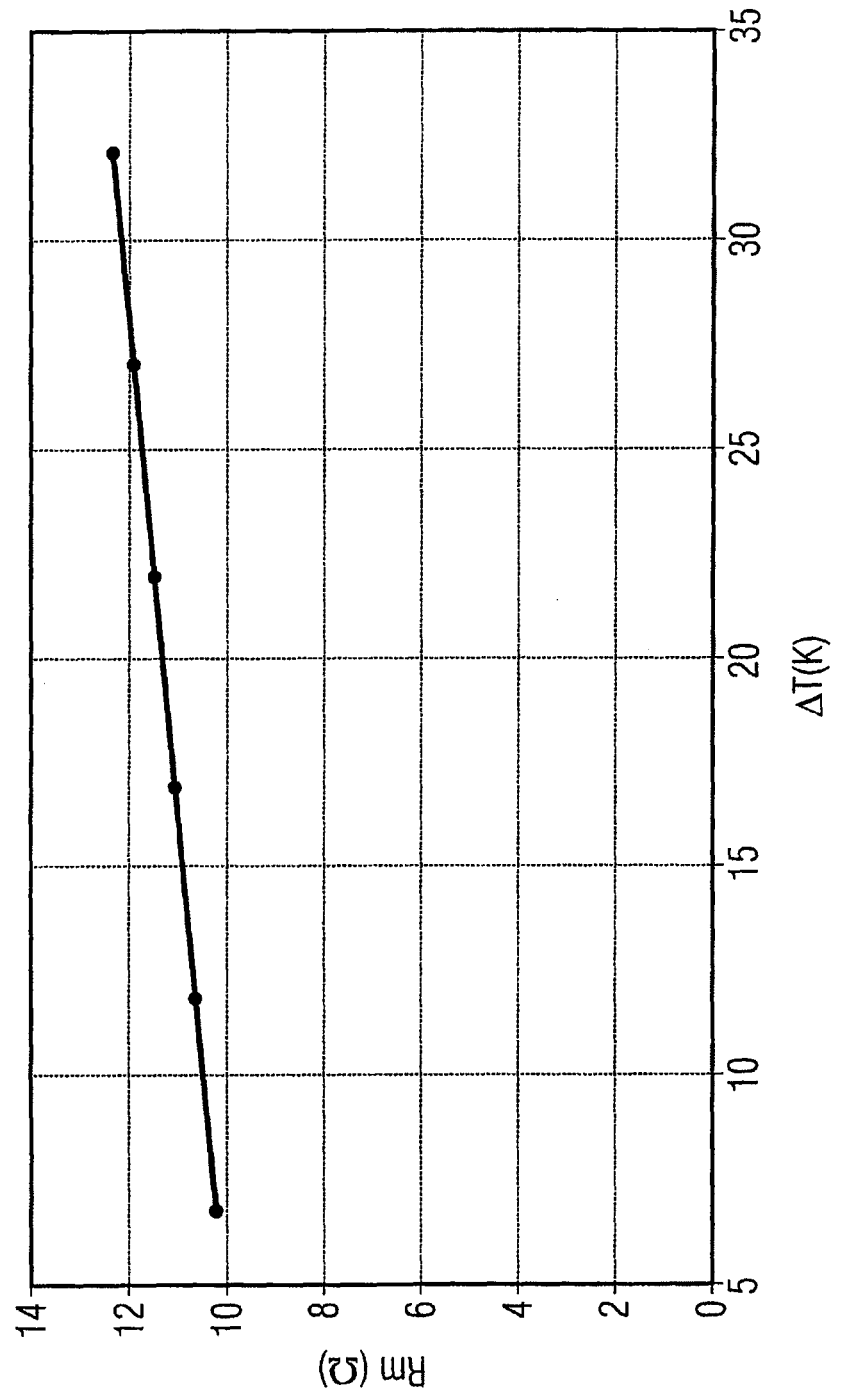
FIG. 6 shows a diagram of an internal resistance of a thermogenerator as a function of the temperature gradient.

FIGS. 4, 5 and 6 show experimental data obtained from measurements done with a Peltron thermo electrical module 128A1030 which is a state of the art thermogenerator. FIG. 4 shows the voltage V across the thermo electrical module connected to different resistors as a function of the current I for different temperature gradients ΔT in the form of a plurality of graphs. The temperature gradients ΔT varies between 6.71 K to 32.05 K. As shown in FIG. 4, the open circuit voltage V=Vteg-oc increases with an increase of the temperature difference ΔT.

FIG. 5 shows the output power P of the thermogenerator versus the output current I for the same temperature gradients ΔT. The maximum power from the thermogenerator is obtained when its output voltage is equal to half the open circuit voltage V=½·Vteg-oc. Thus, a match between the internal resistance of the thermogenerator and the input resistance of the DC-DC converter 200 assures that the maximum power may be achieved from the thermogenerator.

FIG. 6 finally shows that the internal resistance Rm of the thermogenerator slightly increases from 10.2Ω to 12.3Ω with the increment of the temperature gradients considered.

The input resistance of a DC-DC converter, e.g. the simplified version of the DC-DC step-up converter 200 based on coupled inductors shown in FIG. 2 and described in [5], is controllable by influencing its duty cycle D. In the previous discussion, a step-up converter 200, as shown in FIG. 2, has been selected as the DC-DC converter 200 for its use with the maximum power point control circuit, due to the low input voltages obtained from the thermogenerator with temperature gradients under consideration.

As mentioned before, a commonly implemented algorithm in microcontrollers for tracking the maximum power point is the P&O algorithm, where the duty cycle D is perturbed in the same direction when the output power of the DC-DC converter is increasing and in the opposite direction when it is decreasing, as it is outlined in [1]. Analog circuits can also be employed for tracking the maximum power point obtaining high efficiencies as outlined in [4].

When the output of the step-up converter 200 is connected to the battery 440, as shown in FIG. 2, it can be considered that the output voltage of the battery 440 is constant and that the output power is proportional to the output current Ibatt. Therefore, for the maximum power point tracking, only output current measurements are needed to modify the value of the duty cycle D. A simplified version of a step-up converter 200 based on coupled inductors and presented in [5] has been employed for testing purposes of the maximum power point tracking loop. It is the step-up converter 200 shown in FIG. 2, working on the boundary between continuous and discontinuous (current) modes due to the employment of the transformer 260 that causes self-oscillation.

FIG. 7 shows a schematic diagram of an output current Io versus duty cycle D of a step-up DC-DC converter. To be more specific, FIG. 7 shows the duty cycle D versus the output current Io for a step-up converter in the boundary between continuous and discontinuous conduction modes. Thus, the approach employed is to use the derivative dIo/dD (=dIbatt/dD) to change the value of the duty cycle D to force the derivative to zero.

To illustrate this, when the output current Io increases, based on a small perturbation (cf. point A in FIG. 7), the duty cycle should be decreased in terms of its value D to reach the optimum duty cycle Dmaxp. When, however, the current Io decreases (cf. point B in FIG. 7), the duty cycle should be decreased in terms of its value in order to reach the optimum duty cycle Dmaxp.

To go into more detail, FIG. 8 shows the output power Po versus the duty cycle D for the Peltron TEG128A1030 for two different temperature gradients ($\Delta T$=26.93 K and $\Delta T$=16.55 K). As outlined before, due to the higher temperature gradient or temperature difference $\Delta T$, the output power Po is higher for the temperature gradient $\Delta T$=26.93 K when compared to the temperature gradient $\Delta T$=16.55 K.

The maximum power point tracking, however, should be able to change properly the duty cycle D of the DC-DC converter 200 when the temperature gradient of the thermogenerator and, as a consequence, its open circuit voltage Vteg-oc changes.

In FIG. 8 it is assumed that the initial temperature gradient $\Delta T$ is 26.93 K and that the duty cycle is at point 1 which represents a generic point with a value above duty cycle Dmaxp of the maximum power point. In order to increase the output power Po, the duty cycle D should be decreased and the maximum power for this temperature gradient will be reached at point 2.

When the temperature gradient decreases to $\Delta T$=16.55 K, the output power characteristic will change and the working point will be 3, as indicated by the dashed arrow in FIG. 8. Going from point 2 to point 3, the output power Po has decreased and, therefore, the maximum power point has to increase the value D of the duty cycle until it reaches the maximum power point of this power characteristic at point 4.

When the temperature gradient rises again, the working point moves from point 4 to point 5, the output power having also increased. However, the duty cycle D should be decreased until it reaches its maximum power point again at point 2 of the higher temperature $\Delta T$=26.93 K.

If the variation of the output current Io is large, due to a fast variation in the temperature gradient $\Delta T$ of the thermogenerator, the maximum power point tracking may eventually surpass the maximum power point resulting in a temporary loss of power.

FIG. 9 illustrates a situation in which the (control) loop may eventually go to a point of malfunction. As the previous explanation has shown, it is assumed that the temperature gradient at the beginning is $\Delta T$=26.93 K and that the duty cycle D is at point 1. When the duty cycle decreases its value, the working point moves to point 2 as shown in FIG. 9.

When the temperature gradient of the thermogenerator decreases and the working point moves to point 3, the output current Io decreases and therefore the duty cycle may eventually increase its value and follows the wrong direction as illustrated in FIG. 9. However, if the value of the components of the analog circuit are correctly adjusted, the control loop should be able to go afterwards in the correct direction when it detects that the derivative of the current continues decreasing.

As indicated earlier, simulation and measurements have also been carried out employing a control circuit 100, according to an embodiment of the present invention and a DC-DC step-up converter 200 as shown in FIG. 2.

FIG. 10 shows the simulation results, in which in FIG. 10a, the open circuit voltage Vteg-oc of the thermogenerator is shown along with the voltage V=Vteg obtained at the output of the thermogenerator in FIG. 10b. FIG. 10c shows a graph of the voltage vamplif proportional to the output current obtained at the output of the processing unit 120. To be slightly more specific, FIG. 10c shows the output voltage vamplif of a processing unit 120 of a control circuit 100' shown in FIG. 3. FIG. 10d shows a graph of the voltage vdiff at the output of the differentiator 130, while FIG. 10e shows the output voltage vcomp of the inverting amplifier of a comparator unit 140 of a control circuit 100'. Finally, FIG. 10f shows a graph of a control loop voltage vloop at the output of the integrator 150.

As a first overview, FIG. 10 shows the simulation results obtained when the open-circuit voltage Vteg-oc of the thermogenerator is modified and the circuit is adjusted to respond to these changes. The thermogenerator is simulated as a DC voltage supply in series with a resistor. The output of the thermogenerator is connected to the inputs 210 and 230 of the DC-DC converter 200. Starting with a thermogenerator providing an open circuit voltage Vteg-oc, the value of the DC voltage supply in series with a resistor, of 1.18 V, the open circuit voltage decreases at a moment in time indicated by an arrow 700 from 1.18 V to 960 mV. Afterwards, at a moment in time indicated by an arrow 710, the open circuit voltage of the thermogenerator drops to 743 mV. These values correspond to temperature gradients $\Delta T$ of 26.93 K, 21.72 K, and 16.55 K, respectively. Next, at a moment in time indicated by the arrow 720, the open circuit voltage Vteg-oc is increased to its second value and, thereafter, at a moment in time indicated by an arrow 730 to its first value, before finally dropping to the minimum voltage in only one step at the moment in time indicated by the arrow 740. In other words, the simulation shown in FIGS. 10a to 10f illustrates the response of the thermogenerator, the DC-DC converter 200 shown in FIG. 2 and the control circuit 100' shown in FIG. 3, when the external temperature gradient $\Delta T$ changes between the previously mentioned values.

Apart from a short transient phase of less than 0.05 s, the output voltage of the thermogenerator Vteg shown in FIG. 10b oscillates quickly around a stable mean value being approximately half that of the open circuit voltage Vteg-oc. These oscillations, also referred to as ripples, are significantly reduced in the signal at the output of the processing unit 120, as can be seen in FIG. 10c in the signals Vamplif. This is caused by the filtering property of the processing unit 120. At the output of the differentiator 130, the signal vdiff comprises a value of approximately 2.5 V being the value of the reference signal of half of the positive supply voltage. However, since the signal vamplif of the processing unit 120 comprises ripples, also the differentiator signal vdiff comprises corresponding ripples. Nevertheless, without the filtering property of the processing unit 120 of the control circuit 100' according to an embodiment of the present invention, in this situation the amplitude of the ripples would be significantly larger.

Providing the signal vdiff to the comparator unit 140 comprising the inverting amplifier produces the signal vcomp as shown in FIG. 10e. As can be seen, due to the high gain property of the inverting amplifier of the comparator unit 140, the signals vcomp oscillates between the positive supply voltage (5 V) and that of the reference potential or negative power supply voltage (Vss=0 V). The behavior of the comparator signal vcomp may eventually differ from that of a conventional comparator, which may have a latency or hysteresis, so that the ripples of the input signal vdiff will not lead to a corresponding change of the comparator signal vcomp causing an error on the output value achieved by the integrator 150.

The integrator 150, integrating the comparator signal vcomp of the comparator unit 140, leads to the control signal, feedback signal or loop signal vloop as shown in FIG. 10f. The signal vloop comprises a mean value of approximately 2.25 V in the respective time region, but is superposed with a rapid oscillation due to the oscillation of the gate voltage of the transistor 300 of the DC-DC converter 200.

As is outlined in the framework of the description of FIGS. 1 to 3, providing the signals vloop to in input 400 of the DC-DC converter 200 creates the virtual impedance so that the output voltage of the thermogenerator Vteg, as shown in FIG. 10b, is approximately half that of the open circuit voltage Vteg-oc. In other words, the oscillation of the signal of the DC-DC converter 200 creates these small oscillations of the output voltage Vteg of the thermogenerator.

At the moment in time indicated by the arrow 700, the open circuit voltage Vteg-oc (=Vteg (I=0)) of the thermogenerator decreases from 1.18 V to 960 mV, as shown in FIG. 10a. As a consequence, also the output voltage of a thermogenerator Vteg, shown in FIG. 10b, drops accordingly. This drop of the voltage, which is accompanied by a corresponding drop of the current, is also present in the input voltage Vi of a control circuit 100', which, for the sake of simplicity, is not shown in FIG. 10. However, also the signal vamplif of the processing unit 120 shows the steep decrease, which leads to a sharp rise of the differentiated signal for the length of the transition of the output signal vamplif of the processing unit. Due to the differentiator being based on an inverting operational amplifier circuit, the differential signal vdiff comprises a positive signal change, although the input signal decreases.

During the length of the transition of the differentiated signal vdiff, the comparator unit 140 generates a comparator signal vcomp being equal to the negative power supply voltage of the reference potential Vss=0. As a consequence, due to the circuitry used for the integrator 150, the control signal or feedback signal vloop of the integrator 150 rises accordingly as shown in FIG. 10f. It is this change of the control signal vloop that stabilizes the output voltage of the thermogenerator Vteg at half that of the open circuit output voltage Vteg-oc. In other words, the increase of the control signal vloop leads to the adapting of the impedance.

Due to the increase of the control signal vloop the output voltage of the thermogenerator Vteg is set to be half of that of the open circuit Vteg-oc. This can be seen in FIG. 10b by comparing the steepness of the drop with that shown in FIG. 10a. While at the beginning of the drop the steepness of the voltages Vteg-oc and that of the voltage Vteg are comparable, the open circuit voltage Vteg-oc drops abruptly to its final value, while the output voltage of the generator Vteg approaches its final value more slowly. This slower decay in the previously described second phase corresponds, in terms of its length, to the comparator signals vcomp being set to the negative power supply voltage Vss and the rise of the control signal vloop, showing that this slower decrease is caused by the control circuit 100'. Without the control circuit 100', the output voltage Vteg of the thermogenerator would be higher than the desired value of half that of the open circuit voltage source Vteg-oc. Hence, the control circuit keeps track of the maximum power point of the generator.

The situation before the moment of time indicated by the arrow 700 is again repeated before the moment of time indicated by the arrow 710. However, with slightly different voltage levels concerning the open circuit voltage Vteg-oc, the output voltage Vteg of the thermogenerator, and the amplified signal vamplif at the output of the processing unit 120, and the output voltage of the integrator 150 outputting the signal vloop. The situation does not significantly differ at the moment in time indicated by the arrows 710 and 740 from the previously described abrupt change.

The situation at the moments in time indicated by the arrows 720 and 730 does not significantly differ either, apart from the fact that the corresponding changes of the voltage have the opposite sign, so that the comparator signal vcomp of the comparator unit 140 acquires values of the positive supply voltage Vcc=Vbatt. During all these transitions of the open circuit voltage Vteg-oc, the output voltage Vteg of the thermogenerator comprises the previously described two phase change, which may safely be interpreted as changing the impedance of the DC-DC converter 200 due to the control signal vamplif provided to its input 400.

The adjustment of the components of the control loop may cause the response of the control circuit to changes in the open circuit voltage of the thermal generator to surpass the optimum duty cycle. However, the control loop is able to return to the maximum power point and to maintain its value. In other words, even in this case, the control circuit 100 was able to return to the MPP, only the achievable efficiency was slightly decreased.

FIG. 11a shows a table in which the theoretical and the simulated power extracted from the thermogenerator is compared in order to evaluate the accuracy of the maximum power point control loop described above. The difference between the theoretical values and the simulated values is in the range of less than 5% for open circuit voltages Vteg-oc in the range between 0.6 and 0.8 V. Having especially in mind the low-power constraints under which the control circuit 100' and the DC-DC converter 200 operate, the results shown in the table of FIG. 11a, which correspond to the situation, in which the MPP was surpassed, the deviations (referred to as error) are very good.

Moreover, the functionality of the maximum power point tracking circuit has also been tested with the previously mentioned prototype. The table shown in FIG. 11b shows the results obtained. Comparing the theoretical to the measured values shows that the deviations in the voltage regime of the open circuit voltage Vteg-oc between 1 V and 1.4 V is less than 2.5%. This also underlines the capability of the control circuit 100 to very accurately control, even in low-power applications, the DC-DC converter 200.

The control circuit 100 (and 100') according to an embodiment of the present invention represents a simple maximum power point tracking analog circuit, which may be implemented with only four low-power operational amplifiers to be used, for instance, in combination with solar cells or thermogenerators. The maximum power point tracking circuit controls the duty cycle of a step-up converter based on coupled inductors. As shown, the concept of the circuit has been tested and the simulation and practical results have been shown. The maximum power point tracking circuit is able to find the optimum duty cycle to achieve the maximum power point when there is an increase or decrease of the open circuit voltage of the thermogenerator.

With respect to state of the art systems, this may lead to improvements and advantages. Nowadays, the most common techniques of maximum power point tracking employs digital signal processes or microcontrollers. However, simpler solution employing analog circuits exist, but their power consumption and/or complexity is not fully satisfactory for many applications. The maximum power point tracking control system according to an embodiment of the present invention comprises a simple circuit with only four low-power operational amplifiers. It is not needed to include any flip-flop with a clock or an analog multiplier in the control loop to achieve the maximum power point tracking. Moreover, the system has no sign uncertainty due to the employment of a flip-flop, as it is in the case described in [4].

Employing an inverting operational amplifier with high gain in the framework of a comparator unit 140, instead of employing directly a comparator, protects the circuit against time delays in its response that causes voltage drift in the integrator and the stabilization of the control voltage in a wrong value. Furthermore, since the reference signal comprises half the voltage of the difference of the positive and negative supply voltages of the operational amplifiers, the output swings between negative and positive voltage supply and has a zero voltage mean value, when the maximum power point is reached.

Moreover, the DC-DC converter 200 used with the maximum power point tracking is capable of working within the boundary between discontinuous and continuous conduction mode. Thus, it is not possible for the control loop to make a decision that affects the duty cycle of the DC-DC converter 200 based on a change in the current due to the modification of its working mode.

Embodiments according to the present invention, are however, not limited to being used with step-up DC-DC converters based on coupled inductors such as the DC-DC converter 200 shown in FIG. 2. In the control circuit, according to an embodiment of the present invention, may be used with any kind of DC-DC converter, for instance, a step-up converter, a step-down converter, converters based on single inductors, converters based on a capacitive energy storing or other technologies. However, when using, for instance, DC-DC converts based on a single inductor, it might be advisable to implement additional circuits, e.g. a PWM circuit, since these may not be self-oscillating converts eventually.

Moreover, it may be advisable to implement the DC-DC converter so as to ensure it operates in the continuous current (CCP) mode by appropriate design measures (e.g. a corresponding dimensioning of the components). In the case the converter switches between the CCP mode and the DCP mode (DCP=discontinuous current mode), it may happen that the point to which the control circuit drives the DC-DC converter differs more from the ideal maximum power point, than in the case of the converter operating only in the CCP mode or only in the boundary between the CCP and DCP modes.

Moreover, the differentiator 130 may be implemented differently from the differentiator shown in FIG. 3. Also the integrator 150, as shown in FIG. 3, is not required to be based on an operational amplifier circuit. With respect to the optional processing unit 120, also a simple filter having a low-pass filter characteristic, a band-pass characteristic a notch characteristic or a high-pass characteristic may be employed without using an operational amplifier. Naturally, also other implementations based on individual transistors, instead of operational amplifier circuits, may be employed.

For the sake of simplicity in the following, similar reference signs will be replaced by summarizing reference signs. For instance, the control circuits 100, 100' will be denoted at the common, summarizing reference sign 100.

Figure 12A:
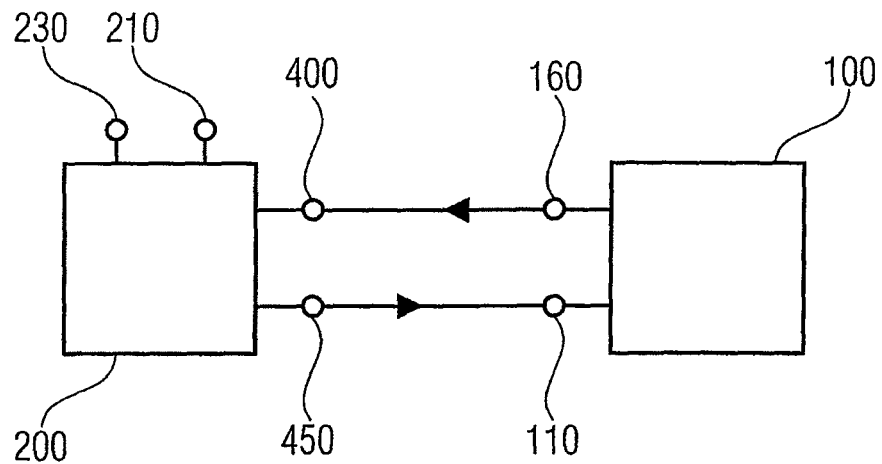
FIG. 12a-b show schematically a DC-DC converter comprising a control circuit according to an embodiment of the present invention and a mobile device according to an embodiment of the present invention, respectively.

FIG. 12a shows schematically a DC-DC converter system 900 according to an embodiment of the present invention, comprising a DC-DC converter 200 with its input 210 for the input voltage Vinput, its further input 230 for the reference potential or the negative power supply voltage, the control signal input 400 and the output 450 as, for instance, outlined in the context of FIG. 2. While the input 210 and the further input 230 may be considered to be an input or terminal for coupling a thermogenerator, a photo cell or another energy harvesting device to, an output to which the load may be coupled is not shown in FIG. 12a for the sake of simplicity only.

The DC-DC converter system 900 further comprises a control circuit 100 according to an embodiment of the present invention as, for instance, outlined in the context of FIG. 1 or 3. The input 110 of the control circuit 100 is coupled to the output 450 of the DC-DC converter 200, while the output 160 of the control circuit 100 is coupled to the control signal input 400 of the DC-DC converter 200. As a consequence, the feedback loop is closed, enabling the DC-DC converter system 900 to operate at the or in the vicinity of the maximum power point of the energy harvesting device connectable to the inputs 210, 230 of the DC-DC converter system 900.

Figure 12B:
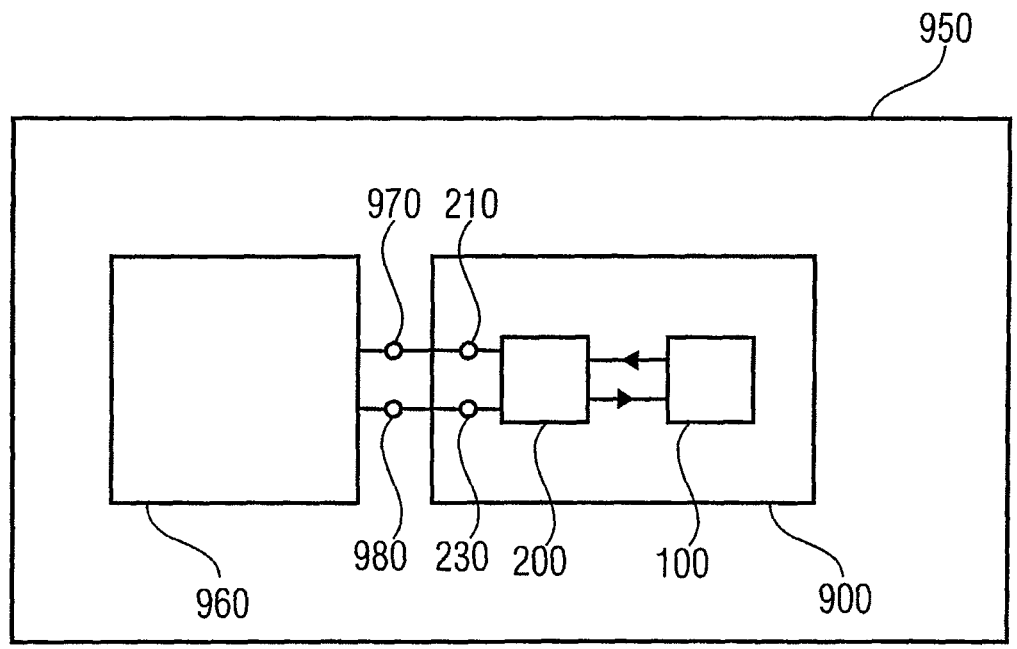

FIG. 12b shows schematically a potential application of a control circuit 100 and a DC-DC converter system 900 according to embodiments of the present invention. FIG. 12b shows a mobile device 950 comprising a DC-DC converter system 900 as outlined in context with FIG. 12a, the DC-DC converter system 900 comprising the control circuit 100 and the DC-DC converter 200 coupled to each other in the described manner.

The mobile device 950 further comprises a thermogenerator 960 with an output 970 and an optional further output 980. In FIG. 12b, the thermogenerator is coupled with the output 970 to the input 210 and with the further output 980 to the further input 230 of the DC-DC converter system 900. Therefore, the thermogenerator is capable of providing the input signals (Vinput and Vss (or GND)) to the DC-DC converter 200 of the DC-DC converter system 900.

The mobile device 950 may be, for instance, a cell or mobile phone, a hand-held computer system (e.g. a PDA (Personal Data Assistant), a navigation system) or any other outdoor equipment (e.g. a digital camera, a watch).

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

REFERENCES

[1] Esram T, Chapman P L S 2007 Comparison of Photovoltaic Array Maximum Power Point Tracking Techniques, *IEEE Transactions on Energy Conversion*, 22, 439-449

[2] Lim Y H, Hamill D C S 2000 Simple maximum power point tracker for photovoltaic arrays, *Electronics Letters*, 36, 997-999

[3] Chavez J A, Ortega J A, Salazar J, Turo A, Garcia M J, S 2000 SPICE Model of Thermoelectric Elements including Thermal Effects, 17*th IEEE Instrumentation and Measurement Technology Conference* (May 2000), 1019-1023

[4] Sullivan C R, Powers M J A High-Efficiency Maximum Power Point Tracker for Photovoltaic Arrays in a Solar-Powered Race Vehicle 24*th Annual IEEE Power Electronics Specialists Conference* (20-24 Jun. 1993), 574-580

[5] Mateu L, Pollack M, Spies P Step-up Converters for Human Body Energy Harvesting TEGs PowerMEMS 2007 (Freiburg, Germany, 28-29 Nov. 2007), 213-216

The invention claimed is:

1. A control circuit for a DC-DC converter, comprising:
an input;
an output; and
a series connection of a differentiator, a comparator unit and an integrator, the series connection being coupled in between the input and the output,
wherein the comparator unit comprises an inverting amplifier,
wherein the comparator unit is adapted to compare an input signal of the comparator unit to a reference signal,
wherein the reference signal is half a voltage level of a voltage of a battery to be charged by the DC-DC converter, and
wherein the differentiator is connected to the input, the integrator is connected to the output, and the comparator unit is connected between the differentiator and the integrator.

2. The control circuit according to claim 1, wherein the inverting amplifier comprises an operational amplifier circuit.

3. The control circuit according to claim 1, wherein the comparator unit further comprises:
an operational amplifier;
a first resistor being coupled to an inverting input of the operational amplifier;
a second resistor being coupled between the inverting input and an output of the operational amplifier; and
the reference signal being coupled to a non-inverting input of the operational amplifier.

4. The control circuit according to claim 1, wherein the comparator unit is coupled behind the differentiator, and wherein the integrator is coupled behind the comparator unit.

5. The control circuit according to claim 1, wherein the series connection further comprises a processing unit adapted to filter the signal received at the input of the control circuit and to provide the signal to the differentiator in a filtered version.

6. The control circuit according to claim 5, wherein the processing unit is adapted to amplify a signal received at the input of the control circuit and to provide the signal to the differentiator in an amplified form.

7. The control circuit according to claim 5, wherein the processing unit is based on an operational amplifier circuit.

8. The control circuit according to claim 7, wherein the processing unit comprises a non-inverting amplifier with a feedback path comprising a parallel circuit of a resistor and a capacitor.

9. The control circuit according to claim 1, wherein the differentiator and the integrator comprise operational amplifier circuits.

10. The control circuit according to claim 1, wherein the control circuit is an analog control circuit.

11. A DC-DC converter system comprising a control circuit for a DC-DC converter, comprising:
an input;
an output; and
a series connection of a differentiator, a comparator unit and an integrator, the series connection being coupled in between the input and the output,
wherein the comparator unit comprises an inverting amplifier,
wherein the comparator unit is adapted to compare an input signal of the comparator unit to a reference signal,
wherein the reference signal is half a voltage level of a voltage of a battery to be charged by the DC-DC converter, and
wherein the differentiator is connected to the input, the integrator is connected to the output, and the comparator unit is connected between the differentiator and the integrator, and
a DC-DC converter, wherein the input of the control circuit is coupled to an output of the DC-DC converter and wherein the output of the control circuit is coupled to a control input of the DC-DC converter.

12. A mobile device comprising:
a DC-DC converter system comprising a control circuit for a DC-DC converter, comprising:
an input;
an output; and
a series connection of a differentiator, a comparator unit and an integrator, the series connection being coupled in between the input and the output,
wherein the comparator unit comprises an inverting amplifier,
wherein the comparator unit is adapted to compare an input signal of the comparator unit to a reference signal,
wherein the reference signal is half a voltage level of a voltage of a battery to be charged by the DC-DC converter,
wherein the differentiator is connected to the input, the integrator is connected to the output, and the comparator unit is connected between the differentiator and the integrator, and
a DC-DC converter, wherein the input of the control circuit is coupled to an output of the DC-DC converter and wherein the output of the control circuit is coupled to a control input of the DC-DC converter; and
a thermogenerator coupled, to an input of the DC-DC converter.

* * * * *

UNITED STATES PATENT AND TRADEMARK OFFICE
CERTIFICATE OF CORRECTION

PATENT NO. : 8,749,218 B2
APPLICATION NO. : 13/101756
DATED : June 10, 2014
INVENTOR(S) : Loreto Mateu, Markus Pollak and Peter Spies It is certified that error appears in the above-identified patent and that said Letters Patent is hereby corrected as shown below:

Title Page, item (73) Assignee:

Fraunhofer-Gesellschaft zur Foerderung der Angewandten Forschung E.V.

should be:

Fraunhofer-Gesellschaft zur Foerderung der angewandten Forschung e.V.

Signed and Sealed this
Twenty-third Day of June, 2015

Michelle K. Lee
*Director of the United States Patent and Trademark Office*